United States Patent
MacGregor et al.

(10) Patent No.: US 8,099,239 B2
(45) Date of Patent: Jan. 17, 2012

(54) ELECTROMAGNETIC SURVEYING FOR RESISTIVE OR CONDUCTIVE BODIES

(75) Inventors: Lucy M. MacGregor, Edinburgh (GB); David Andreis, Les Pennes (FR); Michael Tompkins, Houston, TX (US)

(73) Assignee: Rock Solid Images PLC, London (GB)

( * ) Notice: Subject to any disclaimer, the term of this patent is extended or adjusted under 35 U.S.C. 154(b) by 1188 days.

(21) Appl. No.: 10/598,023

(22) PCT Filed: Feb. 3, 2005

(86) PCT No.: PCT/GB2005/000360
§ 371 (c)(1),
(2), (4) Date: Jun. 15, 2007

(87) PCT Pub. No.: WO2005/081016
PCT Pub. Date: Sep. 1, 2005

(65) Prior Publication Data
US 2007/0288211 A1 Dec. 13, 2007

(30) Foreign Application Priority Data
Feb. 16, 2004 (GB) .................................. 0403372.6

(51) Int. Cl.
*G01V 3/38* (2006.01)
(52) U.S. Cl. ............................................................ 702/5
(58) Field of Classification Search ................ 702/5, 11, 702/13
See application file for complete search history.

(56) References Cited

U.S. PATENT DOCUMENTS
4,617,518 A * 10/1986 Srnka ............................ 324/365
(Continued)

FOREIGN PATENT DOCUMENTS
GB 2 380 550 4/2003
(Continued)

OTHER PUBLICATIONS

Ellingsrud, S. et al. "Remote Sensing of Hydrocarbon Layers by Seabed Logging (SBL): Results From a Cruise Offshore Angola." The Leading Edge. 21.10 (Oct. 2002): 972-982.

(Continued)

*Primary Examiner* — Drew A Dunn
*Assistant Examiner* — Stephen Cherry
(74) *Attorney, Agent, or Firm* — Renner, Otto, Boisselle & Sklar, LLP

(57) ABSTRACT

A method of analyzing electromagnetic survey data from an area of seafloor (6) that is thought or known to contain a conductive or resistive body, such as a subterranean hydrocarbon reservoir (12), is described. The method includes providing electric field data and magnetic field data, for example magnetic flux density, obtained by at least one receiver (25) from a horizontal electric dipole (HED) transmitter (22) and determining a vertical gradient in the electric field data. The vertical gradient in the electric field data and the magnetic field data are then combined to generate combined response data. The combined response data is compared with background data specific to the area being surveyed to obtain difference data sensitive to the presence of a subterranean hydrocarbon reservoir. Because the combined response data are relatively insensitive to the transverse electric (TE) mode component of the transmitted signal, the method allows hydrocarbon reservoirs to be detected in shallow water where the TE mode component interacting with the air would otherwise dominate. Furthermore, because there is no mixing between the TE and transverse magnetic (TM) modes in the combined response data, data from all possible transmitter and receiver orientations may be used. The background data may be provided by magneto-telluric surveying, controlled source electromagnetic surveying or from direct geophysical measurement.

37 Claims, 17 Drawing Sheets

U.S. PATENT DOCUMENTS

| | | | |
|---|---|---|---|
| 4,875,015 A | | 10/1989 | Ward |
| 5,770,945 A | | 6/1998 | Constable |
| 5,825,188 A | * | 10/1998 | Montgomery et al. ....... 324/357 |
| 5,894,450 A | | 4/1999 | Schmidt et al. |
| 7,319,330 B2 | * | 1/2008 | Amundsen ................... 324/337 |

FOREIGN PATENT DOCUMENTS

| | | |
|---|---|---|
| GB | 2 382 875 | 6/2003 |
| GB | 2 385 923 | 9/2003 |
| GB | 2 390 904 | 1/2004 |
| GB | 2 402 745 | 12/2004 |
| WO | 02/14906 | 2/2002 |
| WO | 03/048812 | 6/2003 |
| WO | 03/104844 | 12/2003 |

OTHER PUBLICATIONS

Eidesmo, T. et al. "Sea Bed Logging (SBL), a New Method for Remote and Direct Identification of Hydrocarbon Filled Layers in Deepwater Areas." First Break. 20 (Mar. 2002): 144-152.

MacGregor, Lucy et al. "Use of Marine Controlled-source Electromagnetic Sounding for Sub-basalt Exploration." Geophysical Prospecting. 48 (2000): 1091-1106.

MacGregor, L.M. et al. "The RAMESSES Experiment—III. Controlled-source Electromagnetic Sounding of the Reykjanes Ridge at 57 45N." Geophys. J. Int. 135 (1998): 773-789.

Chave, Allen D. et al. "Controlled electromagnetic sources for measuring electrical conductivity beneath the oceans, 1. Forward problem and model study." J. Geophys. Res. 87.B7 (Jul. 1982): 5327-5338.

Constable, Steven C. et al. "Marine magnetotellurics for petroleum exploration Part 1 : A seafloor equipment system." Geophysics. 63.3 (1998): 816-825.

* cited by examiner $$E_r = \frac{P\rho_0\cos\phi}{4\pi}\int_0^\infty \Bigg[\Bigg(\underbrace{-\beta_0\frac{kJ_0(kr)-\frac{J_1(kr)}{r}}{1+R_L^{TM}e^{-2\beta_0 h}}}_{TM}+\underbrace{i\frac{\omega\mu_0 J_1(kr)}{r\beta_0\rho_0(1-R_A^{TE}R_L^{TE}e^{-2\beta_0 h})}}_{TE}\Bigg)e^{-\beta_0|z-z'|}+$$

$$\Bigg(\underbrace{\beta_0\frac{kJ_0(kr)-\frac{J_1(kr)}{r}}{1+R_L^{TM}e^{-2\beta_0 h}}R_L^{TM}}_{TM}+\underbrace{i\frac{\omega\mu_0 J_1(kr)}{r\beta_0\rho_0(1-R_A^{TE}R_L^{TE}e^{-2\beta_0 h})}R_L^{TE}}_{TE}\Bigg)e^{-\beta_0(z+z')}+$$

$$\Bigg(\underbrace{-\beta_0\frac{kJ_0(kr)-\frac{J_1(kr)}{r}}{1+R_L^{TM}e^{-2\beta_0 h}}}_{TM}+\underbrace{i\frac{\omega\mu_0 J_1(kr)}{r\beta_0\rho_0(1-R_A^{TE}R_L^{TE}e^{-2\beta_0 h})}R_A^{TE}}_{TE}\Bigg)e^{\beta_0(z+z'-2h)}+$$

$$\Bigg(\underbrace{\beta_0\frac{kJ_0(kr)-\frac{J_1(kr)}{r}}{1+R_L^{TM}e^{-2\beta_0 h}}R_L^{TM}}_{TM}+\underbrace{i\frac{\omega\mu_0 J_1(kr)}{r\beta_0\rho_0(1-R_A^{TE}R_L^{TE}e^{-2\beta_0 h})}R_A^{TE}R_L^{TE}}_{TE}\Bigg)e^{\beta_0(|z-z'|-2h)}\Bigg]dk$$

Fig. 5A (EQ.1)

$$E_\phi = \frac{P\rho_0\sin\phi}{4\pi}\int_0^\infty \Bigg[\Bigg(\underbrace{\frac{\beta_0 J_1(kr)}{r(1+R_L^{TM}e^{-2\beta_0 h})}}_{TM}-\underbrace{i\omega\mu_0\frac{kJ_0(kr)-\frac{J_1(kr)}{r}}{\beta_0\rho_0(1-R_A^{TE}R_L^{TE}e^{-2\beta_0 h})}}_{TE}\Bigg)e^{-\beta_0|z-z'|}+$$

$$\Bigg(\underbrace{-\frac{\beta_0 J_1(kr)}{r(1+R_L^{TM}e^{-2\beta_0 h})}R_L^{TM}}_{TM}-\underbrace{i\omega\mu_0\sigma_0\frac{kJ_0(kr)-\frac{J_1(kr)}{r}}{\beta_0(1-R_A^{TE}R_L^{TE}e^{-2\beta_0 h})}R_L^{TE}}_{TE}\Bigg)e^{-\beta_0(z+z')}+$$

$$\Bigg(\underbrace{\frac{\beta_0 J_1(kr)}{r(1+R_L^{TM}e^{-2\beta_0 h})}}_{TM}-\underbrace{i\omega\mu_0\frac{kJ_0(kr)-\frac{J_1(kr)}{r}}{\beta_0\rho_0(1-R_A^{TE}R_L^{TE}e^{-2\beta_0 h})}R_A^{TE}}_{TE}\Bigg)e^{\beta_0(z+z'-2h)}+$$

$$\Bigg(\underbrace{-\frac{\beta_0 J_1(kr)}{r(1+R_L^{TM}e^{-2\beta_0 h})}R_L^{TM}}_{TM}-\underbrace{i\omega\mu_0\frac{kJ_0(kr)-\frac{J_1(kr)}{r}}{\beta_0\rho_0(1-R_A^{TE}R_L^{TE}e^{-2\beta_0 h})}R_A^{TE}R_L^{TE}}_{TE}\Bigg)e^{\beta_0(|z-z'|-2h)}\Bigg]dk$$

Fig. 5B (EQ.2)

$$E_z = \frac{P\rho_0\cos\phi}{4\pi}\int_0^\infty \frac{k^2 J_1(kr)}{1+R_L^{TM}e^{-2\beta_0 h}}\Big[\mp e^{-\beta_0|z-z'|} - R_L^{TM}e^{-\beta_0(z+z')} - e^{\beta_0(z+z'-2h)} \mp R_L^{TM}e^{\beta_0(|z-z'|-2h)}\Big]dk$$

Fig. 5C (EQ.3)

$$B_r = \frac{\mu_0 P \sin\phi}{4\pi} \int_0^\infty \Big[ \pm \Big( \underbrace{\frac{J_1(kr)}{r(1+R_L^{TM}e^{-2\beta_0 h})}}_{TM} + \underbrace{\frac{kJ_0(kr) - \frac{J_1(kr)}{r}}{1-R_A^{TE}R_L^{TE}e^{-2\beta_0 h}}}_{TE} \Big) e^{-\beta_0|z-z'|} +$$

$$\Big( \underbrace{\frac{J_1(kr)}{r(1+R_L^{TM}e^{-2\beta_0 h})}R_L^{TM}}_{TM} - \underbrace{\frac{kJ_0(kr) - \frac{J_1(kr)}{r}}{1-R_A^{TE}R_L^{TE}e^{-2\beta_0 h}}R_L^{TE}}_{TE} \Big) e^{-\beta_0(z+z')} +$$

$$\Big( \underbrace{\frac{J_1(kr)}{r(1+R_L^{TM}e^{-2\beta_0 h})}}_{TM} + \underbrace{\frac{kJ_0(kr) - \frac{J_1(kr)}{r}}{1-R_A^{TE}R_L^{TE}e^{-2\beta_0 h}}R_A^{TE}}_{TE} \Big) e^{\beta_0(z+z'-2h)} \pm$$

$$\Big( \underbrace{\frac{J_1(kr)}{r(1+R_L^{TM}e^{-2\beta_0 h})}R_L^{TM}}_{TM} - \underbrace{\frac{kJ_0(kr) - \frac{J_1(kr)}{r}}{1-R_A^{TE}R_L^{TE}e^{-2\beta_0 h}}R_A^{TE}R_L^{TE}}_{TE} \Big) e^{\beta_0(|z-z'|-2h)} \Big] dk$$

Fig. 5D (EQ.4)

$$B_\phi = \frac{\mu_0 P \cos\phi}{4\pi} \int_0^\infty \Big[ \pm \Big( \underbrace{\frac{kJ_0(kr) - \frac{J_1(kr)}{r}}{1+R_L^{TM}e^{-2\beta_0 h}}}_{TM} + \underbrace{\frac{J_1(kr)}{r(1-R_A^{TE}R_L^{TE}e^{-2\beta_0 h})}}_{TE} \Big) e^{-\beta_0|z-z'|} +$$

$$\Big( \underbrace{\frac{kJ_0(kr) - \frac{J_1(kr)}{r}}{1+R_L^{TM}e^{-2\beta_0 h}}R_L^{TM}}_{TM} - \underbrace{\frac{J_1(kr)}{r(1-R_A^{TE}R_L^{TE}e^{-2\beta_0 h})}R_L^{TE}}_{TE} \Big) e^{-\beta_0(z+z')} +$$

$$\Big( \underbrace{\frac{kJ_0(kr) - \frac{J_1(kr)}{r}}{1+R_L^{TM}e^{-2\beta_0 h}}}_{TM} + \underbrace{\frac{J_1(kr)}{r(1-R_A^{TE}R_L^{TE}e^{-2\beta_0 h})}R_A^{TE}}_{TE} \Big) e^{\beta_0(z+z'-2h)} \pm$$

$$\Big( \underbrace{\frac{kJ_0(kr) - \frac{J_1(kr)}{r}}{1+R_L^{TM}e^{-2\beta_0 h}}R_L^{TM}}_{TM} - \underbrace{\frac{J_1(kr)}{r(1-R_A^{TE}R_L^{TE}e^{-2\beta_0 h})}R_A^{TE}R_L^{TE}}_{TE} \Big) e^{\beta_0(|z-z'|-2h)} \Big] dk$$

Fig. 5E (EQ.5)

$$B_z = \frac{\mu_0 P \sin\phi}{4\pi} \int_0^\infty \frac{k^2 J_1(kr)}{\beta_0(1-R_A^{TE}R_L^{TE}e^{-2\beta_0 h})} \Big[ e^{-\beta_0|z-z'|} + R_L^{TE}e^{-\beta_0(z+z')} + R_A^{TE}e^{\beta_0(z+z'-2h)} +$$

$$R_A^{TE}R_L^{TE}e^{\beta_0(|z-z'|-2h)} \Big] dk$$

Fig. 5F (EQ.6)

$$\frac{\partial E_r}{\partial z} - i\omega B_\phi = -\frac{P\rho_0 \cos\phi}{4\pi} \int_0^\infty k^2 \frac{kJ_0(kr) - \frac{J_1(kr)}{r}}{1 + R_L^{TM} e^{-2\beta_0 h}} \Big[ \pm e^{-\beta_0|z-z'|} + R_L^{TM} e^{-\beta_0(z+z')} + e^{\beta_0(z+z'-2h)} \pm R_L^{TM} e^{\beta_0(|z-z'|-2h)} \Big] dk$$

Fig. 5G (EQ.7)

$$\frac{\partial E_\phi}{\partial z} + i\omega B_r = \frac{P\rho_0 \sin\phi}{4\pi r} \int_0^\infty \frac{k^2 J_1(kr)}{1 + R_L^{TM} e^{-2\beta_0 h}} \Big[ \pm e^{-\beta_0|z-z'|} + R_L^{TM} e^{-\beta_0(z+z')} + e^{\beta_0(z+z'-2h)} \pm R_L^{TM} e^{\beta_0(|z-z'|-2h)} \Big] dk$$

Fig. 5H (EQ.8)

$$E_r + \frac{\rho_0}{\mu_0}\frac{\partial B_\phi}{\partial z} = \frac{P\rho_0 \cos\phi}{4\pi r} \int_0^\infty \frac{k^2 J_1(kr)}{\beta_0(1 - R_A^{TE} R_L^{TE} e^{-2\beta_0 h})} \Big[ e^{-\beta_0|z-z'|} + R_L^{TE} e^{-\beta_0(z+z')} +$$
$$R_A^{TE} e^{\beta_0(z+z'-2h)} + R_A^{TE} R_L^{TE} e^{\beta_0(|z-z'|-2h)} \Big] dk$$

Fig. 17A (EQ.9)

$$E_\phi - \frac{\rho_0}{\mu_0}\frac{\partial B_r}{\partial z} = -\frac{P\rho_0 \sin\phi}{4\pi} \int_0^\infty \frac{k^2}{\beta_0} \frac{kJ_0(kr) - \frac{J_1(kr)}{r}}{1 - R_A^{TE} R_L^{TE} e^{-2\beta_0 h}} \Big[ e^{-\beta_0|z-z'|} + R_L^{TE} e^{-\beta_0(z+z')} +$$
$$R_A^{TE} e^{\beta_0(z+z'-2h)} + R_A^{TE} R_L^{TE} e^{\beta_0(|z-z'|-2h)} \Big] dk$$

Fig. 17B (EQ.10)

ELECTROMAGNETIC SURVEYING FOR RESISTIVE OR CONDUCTIVE BODIES

This application is a national phase of International Application No. PCT/GB2005/000360 filed Feb. 3, 2005 and published in the English language.

BACKGROUND OF THE INVENTION

The invention relates to seafloor electromagnetic surveying for resistive and/or conductive bodies, for example for oil and other hydrocarbon reserves or subterranean salt bodies.

FIG. 1 schematically shows a surface vessel 14 undertaking controlled source electromagnetic (CSEM) surveying of a subterranean strata configuration using standard techniques [1]. The subterranean strata configuration in this example includes an overburden layer 8, an underburden layer 9 and a hydrocarbon reservoir 12. The surface vessel 14 floats on the surface 2 of a body of water, in this case seawater 4 of depth h meters. A submersible vehicle 19 carrying a source in the form of a horizontal electric dipole HED transmitter 22 is attached to the surface vessel 14 by an umbilical cable 16. This provides an electrical and mechanical connection between the submersible vehicle 19 and the surface vessel 14. The HED transmitter is supplied with a drive current so that it broadcasts an HED electromagnetic (EM) signal into the seawater 4. The HED transmitter is positioned a height z' (typically around 50 meters) above the seafloor 6. The EM signals comprise transverse electric (TE) and transverse magnetic (TM) mode components.

One or more remote receivers 25 are located on the seafloor 6. Each of the receivers 25 include an instrument package 26, a detector 24, a floatation device 28 and a ballast weight (not shown). The detector 24 comprises an orthogonal pair of horizontal electric dipole detectors and an orthogonal pair of horizontal magnetic field detectors positioned a height z above the seafloor 6. The horizontal electric dipole detectors are sensitive to horizontal components of the electric fields induced by the HED transmitter in the vicinity of the receiver 25, and produce electric field detector signals therefrom. The horizontal magnetic field detectors are sensitive to horizontal components of the magnetic fields, for example the magnetic flux density, induced by the HED transmitter in the vicinity of the receiver 25, and produce magnetic field detector signals therefrom. The instrument package 26 records the detector signals for later analysis. Examples of suitable receivers are described by Constable [8] and U.S. Pat. No. 5,770,945 [9].

The HED transmitter 22 broadcasts EM signals that propagate outwards both into the overlying water column 4 and downwards into the seafloor 6 and the underlying strata 8, 9, 12. At practical frequencies for this method and given the typical resistivity of the respective media 4, 8, 9, 12, propagation occurs by diffusion of electromagnetic fields. The rate of decay in amplitude and the phase shift of the signal are controlled both by geometric spreading and by skin depth effects. Because in general the underlying strata 8, 9, 12 are more resistive than the seawater 4, skin depths in the underlying strata 8, 9, 12 are longer. As a result, electromagnetic fields measured by a receiver located at a suitable horizontal separation are dominated by those components of the transmitted EM signal which have propagated downwards through the seafloor 6, along within the underlying strata 8, 9, 12, and back up to the detector 24 rather than directly through the seawater 4.

A sub-surface structure which includes a hydrocarbon reservoir, such as the one shown in FIG. 1, gives rise to a measurable increase in the horizontal electric field component amplitudes measured at the receiver relative to a sub-surface structure having only water-bearing sediments. This is because hydrocarbon reservoirs have relatively high resistivities (typically 100 $\Omega$m) compared to other subterranean strata (typically 1 $\Omega$m) and so the EM signals are less attenuated. It is this enhancement in horizontal electric field amplitudes which has been used as a basis for detecting hydrocarbon reservoirs [1].

It is important when surveying for hydrocarbon reservoirs to carefully consider the orientation of the current flows induced by a transmitted EM signal. The response of seawater and subterranean strata (which will typically comprise planar horizontal layers) to EM signals is generally very different for TE mode components of the transmitted signal, which excite predominantly horizontal current flows, and TM mode components, which excite significant components of vertical current flow.

For TE mode components, the coupling between the layers comprising the subterranean strata is largely inductive. This means the presence of thin resistive layers (which are indicative of hydrocarbon reservoirs) does not significantly affect the EM fields detected at the surface as the large scale current flow pattern is not affected by the thin layer. On the other hand, for TM mode components, the coupling between layers includes a significant galvanic component (i.e. due to the direct transfer of charge between layers). For the TM mode even a thin resistive layer strongly affects the EM fields detected at the receiver since the large scale current flow pattern is interrupted by the resistive layer. It is known therefore that a significant component of the TM mode is required to satisfactorily perform an EM survey in the field of oil exploration.

However, sole reliance on the sensitivity of the TM mode components to the presence of a thin resistive layer can lead to ambiguities. The effects on detected EM fields arising from the presence a thin resistive layer can be indistinguishable from the effects arising from other realistic large scale subterranean strata configurations. In order to resolve these ambiguities it is known to determine the response of the subterranean strata to both TM mode components (i.e. inductively coupled) and TE mode components (i.e. galvanically coupled) [1].

The HED transmitter 22 shown in FIG. 1 simultaneously generates both TE and TM mode components with the relative contribution of each mode to the signal at the receiver depending on the HED transmitter-receiver orientation. At receiver locations which are broadside to the HED transmitter axis, the TE mode dominates the response. At receiver locations which are inline with the HED transmitter axis, the TM mode is stronger (although the TE mode is still present) [1, 2, 3, 4]. The response at receiver locations in both the inline and broadside configurations is governed by a combination of the TE and TM mode components, and these tend to work in opposition.

Previous surveys [5, 6] have relied on this geometric splitting of the TE and TM mode components to determine the different response of the subterranean strata to the different modes. This is achieved by collecting electric field amplitude data for different transmitter-receiver alignments. This approach provides complementary horizontal electric field amplitude data sets which are differently sensitive to the TE and TM mode components of the transmitted EM signals. During analysis, these complementary data sets are combined to reveal differences between the TE mode and TM mode coupling between the transmitter and the receiver. These differences are indicative of the presence or not of a subterranean hydrocarbon reservoir. Because of the need to survey with multiple transmitter-receiver alignments, this approach requires a relatively large numbers of tow lines and receivers to ensure adequate coverage.

FIG. 2 shows in plan view an example survey geometry for collecting horizontal electric field component data to be analysed according to known methods. Sixteen receivers 25 are laid out in a square grid on a section of seafloor 6 above a subterranean reservoir 56 having a boundary indicated by a heavy line 58. The orientation of the subterranean reservoir is indicated by the cardinal compass points (marked N, E, S and W for North, East, South and West respectively) marked in the upper right of the figure. To perform a survey, a transmitter starts from location 'A' and is towed along a path indicated by the broken line 60 through location 'B' until it reaches location 'C' which marks the end of the survey path. As is evident, the tow path first covers four parallel paths aligned with the North-South direction to drive over the four "columns" of the receivers. This part of the survey path moves from location 'A' to 'B'. Starting from location 'B', the survey path then covers four paths aligned with the East-West direction which drive over the four "rows" of receivers. Each receiver is thus driven over in two orthogonal directions. The survey is completed when the transmitter reaches the location marked 'C'.

During the towing process, each of the receivers 25 presents several different orientation geometries with respect to the transmitter. For example, when the transmitter is directly above the receiver position D1 and on the North-South aligned section of the tow path, the receivers at positions D5, D6 and D7 are at different separations in an inline position (i.e. aligned with the dipole axis of the HED transmitter), the receivers at positions D2, D3 and D4 are at different horizontal separations in a broadside position and the receiver at positions D8 and D9 are inbetween. However, when the transmitter later passes over the receiver position D1 when on the East-West aligned section of the tow path, the receivers at positions D5, D6 and D7 are now in a broadside position, and the receivers at position D2, D3 and D4 are in an inline position. Thus, in the course of a survey, and in conjunction with the positional information of the transmitter, data from the receivers can be used to provide details of the signal transmission through the subterranean strata for a comprehensive range of distances and orientations between transmitter and receiver, each with varying TM mode and TE mode contributions to the signal propagation.

In addition to requiring relatively complex tow paths, another problem with known survey and analysis techniques is they do not provide good results for surveys made in shallow waters. This is due to the presence of an 'airwave' component in the EM fields induced by the HED transmitter at the receiver. This airwave component is due to EM signals from the HED transmitter which interact with the air. Since air is non-conducting and hence causes little attenuation, the airwave component can dominate the fields at the receiver. The airwave component is principally due to the TE mode components. This is because the TE mode components are efficiently inductively coupled across the seawater-to-air interface. The TM mode components, on the other hand, do not couple well across this boundary and consequently do not contribute significantly to the airwave component. The airwave component contains little information about subterranean resistivity. Accordingly, if the airwave contributes a significant component to the EM fields induced by the HED transmitter at the receiver, the sensitivity of the technique to subterranean resistivity structures, such as hydrocarbon reservoirs, is greatly reduced. The path of an example airwave component is shown in FIG. 1 by a dotted line labelled AW. The magnitude of the airwave component is reduced only by geometric spreading. This is because air is non-conducting. However, as with other components, the airwave component is strongly attenuated by its passage through the seawater. This means that in relatively deep water (large h) the airwave component is not very significant at the receiver and as such does not present a major problem. However in shallow water (small h) the airwave component does not pass through as much seawater and thus makes a larger contribution to the EM fields induced by the HED transmitter at the receiver. This contribution becomes greater still at increasing transmitter-receiver horizontal separations. This is because (other than due to geometric spreading) the strength of the airwave component is relatively constant over a wide range of horizontal separations since any extra distance traveled by the airwave component is almost exclusively in the non-attenuating air. Other components of the EM fields induced by the HED at the receiver, such as those which pass through the subterranean strata and are of interest, travel through lower resistivity media and become increasing attenuated as they travel further. For these reasons, the airwave component tends to dominate the EM fields induced by the HED transmitter at the receiver for surveys made in shallow water, especially at long transmitter-receiver horizontal separations.

The existence of the airwave as a dominant component of the detector signals limits the applicability of the above described surveying and analysis techniques. In shallow water the transmitter-receiver separations over which the techniques can be applied is much reduced. This not only leads to a need to employ more receiver locations to adequately cover a given area, but also limits the depth beneath the seafloor to which the technique is sensitive. This can mean that a buried hydrocarbon reservoir in shallow water may not be detectable, even though the same reservoir would be detected in deeper water.

FIG. 3A is a graph schematically showing results of one-dimensional modelling of two example EM surveys of the kind shown in FIG. 1. One example corresponds to a survey performed in deep water (dotted line) and the other to a survey performed in shallow water (solid line). For each model survey the amplitude of an electric field component induced at the receiver in response to the HED EM transmitter is calculated per unit transmitter dipole moment and is plotted as a function of horizontal separation r between the HED transmitter and the receiver. For both model surveys, the subterranean strata configuration is a semi-infinite homogeneous half space of resistivity 1 $\Omega$m. In the deep-water example, the subterranean strata configuration is located beneath an infinite extent of seawater. In the shallow-water example, it is located beneath a 500-meter depth of seawater. In both cases the seawater has resistivity 0.3 $\Omega$m. The transmitter and receiver are separated along a line which runs through the axis of the HED transmitter (inline orientation). It is the component of detected electric field resolved along this direction which is plotted in FIG. 3A. The HED transmitter is driven by an alternating current (AC) drive signal at a frequency of 0.25 Hz.

The effect of the airwave component on the amplitude of EM fields induced by the HED transmitter at the receiver is clear. In the deep-water model survey, where there is no airwave component, the calculated electric field amplitude falls steadily with increasing horizontal separation. In the shallow-water model, however, where there is a strong airwave component, the rate of amplitude reduction sharply decreases at a transmitter-receiver horizontal separation of about 5000 m. FIG. 3B is a plot showing the ratio, p, of the two curves shown in FIG. 3A. The large deviations from unity seen in FIG. 3B highlight the difference between these curves. Since the only difference between the two model surveys is the presence or not of an airwave component, the ratio plotted in FIG. 3A effectively shows the relative strength of the airwave component in the detected signal compared to that which passes through the subterranean strata for the shallow-water model survey.

It is apparent from FIGS. 3A and 3B that at all but the very shortest horizontal separations the detected electric field is significantly larger in the shallow-water model. For example, at a horizontal separation of 2500 m, the amplitude of the detected signal in the deep-water model survey is around $10^{-12}$ V/Am$^2$. In the shallow-water model survey it is higher at around $10^{-11.5}$ V/Am$^2$. This is due to the additional contribution of the airwave component. This level of increase shows that the airwave component has an amplitude more than double that of the component which has passed through the subterranean strata, and accordingly over two-thirds of the detector signal carries almost no information about the subterranean strata. At greater horizontal separations the airwave component dominates even more. In particular, it becomes especially pronounced beyond around 5000 m. At this point there is a break in the rate at which the detected electric field amplitude falls with increasing horizontal separation. At a horizontal separation of around 7000 m, the airwave component in the shallow-water example has an amplitude around twenty times greater than that of the signal which passes through the subterranean strata. This clearly imposes high requirements for the signal-to-noise ratio of data collected over these sorts of horizontal separations, as is generally the case when a small signal rides on a large background. It is apparent that the airwave significantly limits the usefulness of these surveying and analysis techniques in shallow water.

While this survey method has been demonstrated to provide good results in practice, as noted above some limitations have been identified.

Firstly, since the TE and TM mode components cannot be easily separated there will generally be a level of cross-talk between them at a receiver. This may lead to ambiguities in the results.

Secondly, in order to obtain survey data from both inline and broadside geometries, the HED transmitter needs to be re-oriented at each HED transmitter survey location. This requires the surface vessel to make multiple passes over broadcast locations and can lead to complex and long tow patterns.

SUMMARY OF THE INVENTION

According to a first aspect of the invention, there is provided a method of analysing results from an electromagnetic survey of an area that is thought or known to contain a subterranean resistive or conductive body, comprising: providing electric field data and magnetic field data obtained by at least one receiver from at least one horizontal electric dipole (HED) transmitter; determining a vertical gradient in the electric field data; and combining the vertical gradient in the electric field data with the magnetic field data to generate combined response data.

In this case, references to vertical and horizontal indicate that a significant component, preferably a major component, of the respective signals should be aligned with the vertical and horizontal axes. It is not necessary that the signals are perfectly aligned to the vertical and horizontal axes, although close alignment is preferred to provide a strong signal and reduce the complexity of analysis, for example alignment within +/−30° is desirable.

By generating combined response data in the analysis, it is possible to analyse survey results taken in shallower water than has previously been possible. This is because the combined response data are not sensitive to transverse electric (TE) mode components which have propagated through air and which tend to dominate survey results analysed with previous methods. In addition, because suitable combined response data can be formed for all transmitter-receiver orientations, a complete survey can be carried out with a single tow. In contrast, with previously proposed EM survey analysis methods based on use of HED transmitters, two sets of survey data had to be obtained with different tows over different paths in order to probe the response of an area of interest galvanically and inductively.

Combined response data of this kind are functionally similar to vertical electric field data. Accordingly, the combined response data provide similar benefits to those achievable with data from vertical electric field detectors, such as the benefits described in the inventors' co-pending UK patent application GB-A-2 402 745 (application number 0313376.6) [10]. With the present invention, these are achieved without relying on vertical field measurements. This is beneficial because vertical field measurements can be more susceptible to noise, particularly motion-induced noise caused by undersea water currents.

The resistive or conductive body might be a body which is more resistive than surrounding strata, such as a hydrocarbon reservoir (e.g. oil, gas, methane hydrate) or salt body, or a body which is more conductive than surrounding strata, such as siliceous sediments.

The electric field data may include a horizontal component of electric field resolved along a first direction and the magnetic field data may include a horizontal component of magnetic flux density, resolved along a second, different, direction. The first and second directions may be orthogonal. Furthermore, in some examples the first direction may be parallel to a line connecting the HED transmitter to the receiver while in other examples it may be perpendicular to such a line.

Although specialist equipment can be used to collect the data, suitable data can also be collected using existing equipment. This means the method may be applied to existing data. The analysis method allows for relatively simple combinations, for example, linear combinations, of the vertical gradient in the electric field data and the magnetic field data to be made to generate appropriate combined response data.

Vertical gradients in the electric field may be determined in several ways. One way is by comparing electric field data for different heights. For example for different heights of transmitter and/or detector. Two or more different heights may be used. Another way is to compare the electric field data with data simulated using a background model. The data simulated using a background model may include a boundary condition, such as an assumed or modelled electric field at a boundary between the seawater and air overlying the area surveyed, for example. Yet another way is to determine the vertical electric field gradient at or in the vicinity of a first receiver by comparing electric field data from the first receiver when the transmitter is above a second receiver with electric field data from the second receiver when the transmitter is above the first receiver, and applying a predetermined adjustment to the electric field data from second receiver.

The method may further comprise providing background data specific to the area being surveyed; and comparing the combined response data with the background data to obtain difference data sensitive to the presence of a subterranean resistive or conductive body.

This can be beneficial since the comparison of the combined response data with background data can help to determine whether features of the combined response data are indicative of a resistive or conductive body or arise as a result of some other local background structure configuration. Background data may be obtained by modelling the EM survey performed to obtain the combined response data with a model background subterranean strata configuration. The background model strata configuration should preferably be a close match to the actual background structure in the area being surveyed.

The background data may be obtained in several ways, for example from a controlled source electromagnetic survey, from a magneto-telluric electromagnetic survey, from another similar survey taken at a different time, or from a rock formation model. If a rock formation model is used it should preferably include resistivity, and may be derived from a combination of geological data and resistivity data. The geological data can be from seismological surveying and the resistivity data from well logging. Other sources of information, such as neutron data or other porosity estimates from well logs, could also be used.

In some examples, the background data may be obtained from the electric and magnetic field data used to provide the combined response data. This can be achieved by combining the data in a different way. For example, determining a vertical gradient in the magnetic field data and combining it with electric field data. The vertical gradient in the magnetic field data can be determined in ways similar to those described above for the vertical gradient in the electric field data.

The difference data may represent the difference between the combined response data and the background data as a function of position within the area surveyed, and the analysis may include identifying a location of a boundary of a subterranean resistive or conductive body.

According to a second aspect of the invention there is provided a computer program product bearing machine readable instructions for implementing a method of analysing results from an electromagnetic survey according to the first aspect of the invention.

According to a third aspect of the invention there is provided a computer apparatus loaded with machine readable instructions for implementing the method of analysing results from an electromagnetic survey according to the first aspect of the invention.

According to a fourth aspect of the invention there is provided a method of planning an electromagnetic survey of an area that is thought or known to contain a subterranean resistive or conductive body, comprising: creating a model of the area to be surveyed including a rock formation containing a postulated resistive or conductive body, and a body of water above the rock formation; setting values for water depth, depth of the postulated resistive or conductive body, and resistivity structure of the rock formation; and performing a simulation of an electromagnetic survey in the model of the survey area by calculating electric field data and magnetic field data obtained by at least one simulated receiver detecting signals from a simulated horizontal electric dipole (HED) transmitter; determining a vertical gradient in the electric field data; and combining the vertical gradient in the electric field data with the magnetic field data to generate combined response data.

The method may further comprise adjusting the model to remove the postulated resistive or conductive body and repeating the simulation to obtain background data for comparison with the combined response data.

Repeated simulations for a number of transmitter-receiver horizontal separations and frequencies of signal can be performed in order to allow optimum surveying conditions in terms of transmitter-to-receiver distance and frequency of EM signal for probing the resistive or conductive body to be selected when performing an electromagnetic survey. The effects and usefulness of differing receiver array configurations and transmitter tow paths can also be modelled.

Again, the resistive or conductive body might be a body which is more resistive than surrounding strata, such as a hydrocarbon reservoir.

According to a fifth aspect of the invention there is provided a computer program product bearing machine readable instructions for implementing the method of planning an electromagnetic survey according to the fourth aspect of the invention.

According to a sixth aspect of the invention there is provided a computer apparatus loaded with machine readable instructions for implementing the method of planning an electromagnetic survey according to the fourth aspect of the invention.

According to a seventh aspect of the invention there is provided an electromagnetic survey method applied to a survey area that is thought or known to contain a subterranean resistive or conductive body, the survey area comprising subterranean strata beneath a seafloor, the method comprising: providing at least one transmitter and at least one detector for transmission and detection of electromagnetic signals; and obtaining data with transmission and/or detection at a plurality of different heights above the seafloor over the survey area, so that the data allow comparison of electromagnetic signals transmitted and/or received at different vertical displacements.

Such a survey method provides data which allow gradients in electric field data to be determined such that the data may be analysed according to the methods of the first aspect of the invention.

The transmission and/or detection at a plurality of different heights may comprise detection at a plurality of different heights. The detection at a plurality of different heights may be made simultaneously using multiple detectors.

Because of the reciprocity between transmitter and detector, the transmission and/or detection at a plurality of different heights may equally comprise transmission at a plurality of different heights. The transmission at a plurality of different heights may made simultaneously by multiple transmitters, or at different times by a single transmitter. For example, a mobile transmitter may be first towed along a tow path at one height and then re-towed along at least parts of the tow path at a different height.

As with other aspects of the invention, the resistive or conductive body might be a body which is more resistive than surrounding strata, for example a hydrocarbon reservoir or salt body.

According to an eighth aspect of the invention there is provided an electromagnetic receiver for use in an electromagnetic survey of an area that is thought or known to contain a subterranean resistive or conductive body, the area comprising subterranean strata beneath a seafloor, the receiver, when normally deployed, being operable to measure electric fields at two or more different heights above the seafloor such that a vertical gradient in electric field may subsequently be determined.

Such a receiver is suitable for performing a survey according to the seventh aspect of the invention.

The receiver may be further operable to measure magnetic fields at two or more different heights above the seafloor such that a vertical gradient in magnetic field may subsequently be determined.

The receiver, when normally deployed, may comprise first and second pairs of horizontally aligned electric dipole detectors extending in different horizontal directions, the pairs being positioned at different heights.

The receiver, when normally deployed, may further comprise first and second pairs of magnetic field detectors for detecting magnetic fields in different horizontal directions, the pairs being positioned at different heights.

According to a ninth aspect of the invention there is provided and electromagnetic source for use in an electromagnetic survey of an area that is thought or known to contain a subterranean resistive or conductive body, the area comprising subterranean strata beneath a seafloor, the source comprising two transmitters which in normal use are at different heights above the seafloor.

The source may be a mobile source, for example a pair of HED transmitters towed by a single submersible vehicle, or a pair of submersible vehicles each toeing a single transmitter.

Source according to the ninth aspect of the invention are suitable for performing a survey according to the seventh aspect of the invention.

BRIEF DESCRIPTION OF THE DRAWINGS

For a better understanding of the invention and to show how the same may be carried into effect reference is now made by way of example to the accompanying drawings, in which:

FIGS. 5A-5F show equations (Equations 1 to 6) corresponding to solutions to Maxwell's equations for an HED transmitter in a finite seawater layer overlying a one-dimensional subterranean resistivity structure for the radial (r), azimuthal ($\phi$) and vertical (z) components of the electric (E) and magnetic (B) fields;

FIG. 5G shows an equation (Equation 7) defining a linear combination of a vertical gradient in radial electric field data ($E_r$) and azimuthal magnetic field data ($B_\phi$) used in a method of analysing survey data according to a first embodiment of the invention;

FIG. 5H shows an equation (Equation 8) defining a linear combination of a vertical gradient in the azimuthal electric field data ($E_\phi$) and the radial magnetic field data ($B_r$) used in a method of analysing survey data according to a second embodiment of the invention;

FIG. 17A shows an equation (Equation 9) defining a linear combination of radial electric field data ($E_r$) and a vertical gradient in azimuthal magnetic field data ($B_\phi$);

FIG. 17B shows an equation (Equation 10) defining a linear combination of azimuthal electric field data ($E_\phi$) and a vertical gradient in radial magnetic field data ($B_r$);

DETAILED DESCRIPTION

Figure 1:
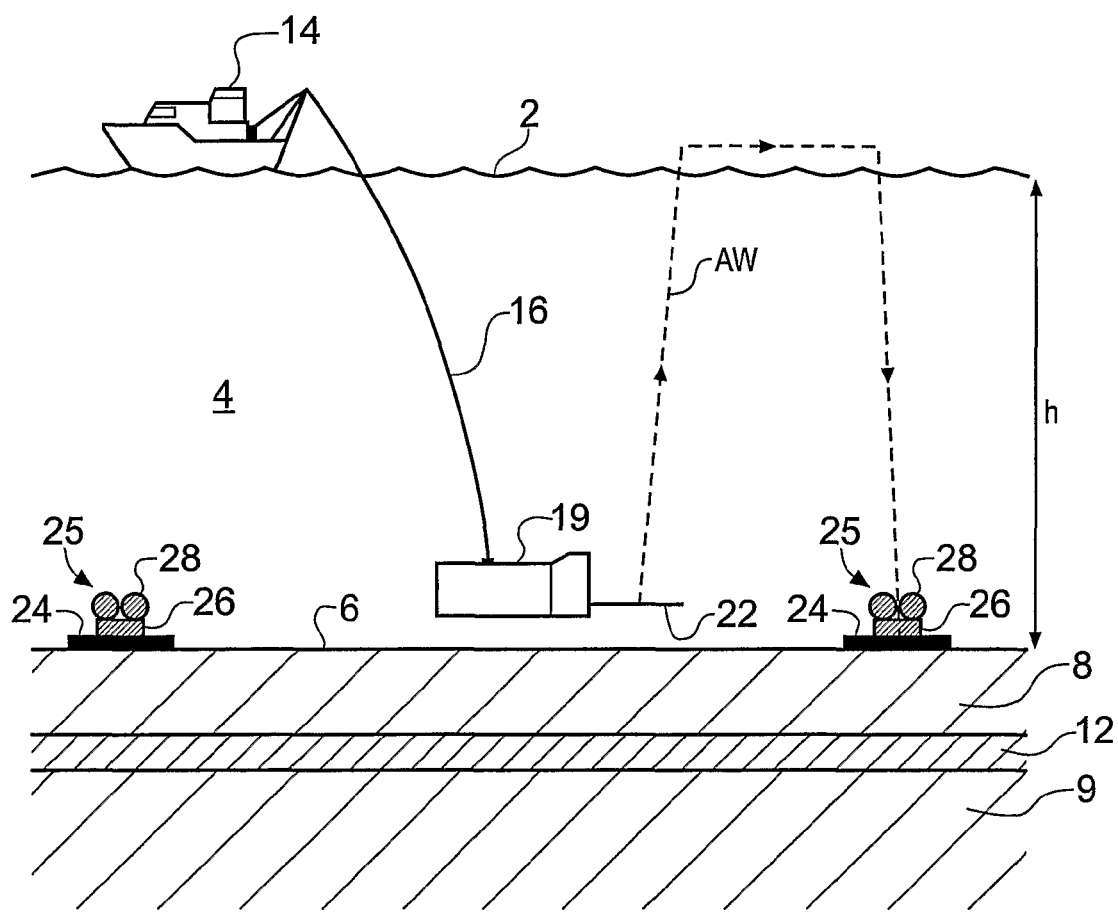
FIG. 1 shows in schematic vertical section a surface vessel undertaking an EM survey in deep water according to standard techniques.
Figure 4:
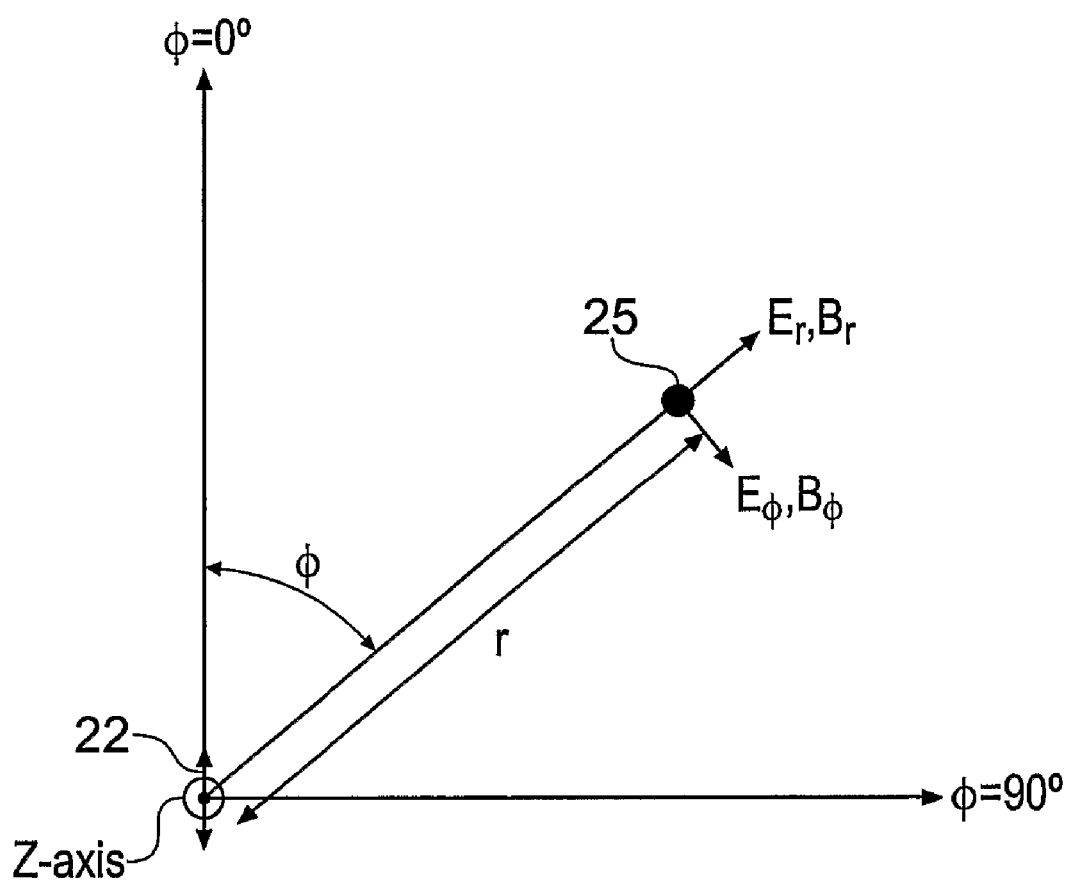
FIG. 4 is a plan view detailing a cylindrical polar co-ordinate system.

FIG. 4 is a schematic plan view showing a co-ordinate system for describing the relative placement of an HED transmitter 22 and a receiver 25 of the kind shown in FIG. 1. The position of the receiver 25 with respect to the HED transmitter 22 is most suitably described in cylindrical polar co-ordinates, with the centre of the HED transmitter 22 providing the origin of the co-ordinate system. The position of the receiver 25 is defined by an azimuthal angle $\phi$ and a distance r. The angle $\phi$ is measured clockwise from a line passing through, and running parallel to, the HED transmitter axis, as indicated in FIG. 4 by the line marked $\phi=0°$. A receiver placed along this line, i.e. such that is has an azimuthal angle $\phi$ of 0°, is referred to as being in an inline position. A receiver with an azimuthal angle $\phi$ of 90°, such that it lies on the line marked $\phi=90°$ in FIG. 4, is referred to as being in a broadside position. The electric field strength at the receiver measured by the orthogonal pair of horizontal electric dipole detectors is resolved into a radial component $E_r$ and an orthogonal azimuthal component $E_\phi$, as indicated in the figure. The magnetic flux density at the receiver measured by the orthogonal pair of horizontal magnetic field detectors is similarly resolved into a radial component $B_r$ and an orthogonal azimuthal component $B_\phi$. The axial co-ordinate z extends vertically away from the seafloor.

The fundamental equations governing electromagnetic induction in the earth are Maxwell's equations. At frequencies typically used in CSEM surveys displacement currents can be neglected to give: $\nabla \cdot B = 0$, $\nabla \times E + i\omega B = 0$ and $\nabla \times B - \mu_0 \sigma E = \mu_0 J$, where $E$ is the electric field strength, $B$ is the magnetic flux density, $\sigma$ is the conductivity of the medium, $\mu_0$ is the magnetic permeability which is assumed to take its free space value, $J$ is the source current density, and a single Fourier component proportional to $e^{i\omega t}$ is considered. Maxwell's equations can be solved numerically in two- or three-dimensions for a point HED transmitter, however a closed form exists only for one-dimensional structures. Chave & Cox [7] derive a solution for the case of an HED transmitter in an infinite depth of seawater for a one-dimensional subterranean strata configuration (i.e. in which resistivity varies only in the vertical z-direction).

The inventors have performed an extension of the analysis presented in Chave & Cox [7] to model an HED transmitter in a finite depth h of seawater. Solving Maxwell's equations for an HED transmitter in a finite seawater layer overlying a one-dimensional subterranean resistivity structure provides equations for the radial (r), azimuthal ($\phi$) and vertical (z) components of the electric field (E) and magnetic flux density (B) as shown in FIGS. 5A to 5F. Although this modelling has been performed for a one-dimensional strata configuration, similar modelling may be performed in two- or three-dimensions.

Where the "$\pm$" or the "$+\mp$" optional operator appears in the equations shown in FIGS. 5A to 5F, the upper symbol is used when z'>z and the lower symbol when z'<z. In these equations, z' and z are the heights of the HED transmitter and detector above the seafloor respectively, h is the depth of the seawater, $\mu_0$ is the permeability of free space, P is the transmitter dipole moment, $$J_0(kr) = \sum_{l=0}^{\infty} \frac{(-1)^l}{2^{2l}(l!)^2}(kr)^{2l} \text{ and } J_1(kr) = \sum_{l=0}^{\infty} \frac{(-1)^l}{2^{2l+1}l!(1+l)!}(kr)^{2l+1}$$

are zeroth and first order Bessel functions respectively, $\rho_0$ is the resistivity of the seawater, k is a parameter analogous to the wave number in a Fourier integral, $$\beta_0 = \sqrt{k^2 - \frac{i\omega\mu_0}{\rho_0}},$$

$R_L^{TM}$ and $R_L^{TE}$ are coefficients defining the TM and TE mode interaction with the seafloor which depend on the resistivity structure of the subterranean strata configuration, and $R_A^{TE}$ is a coefficient defining the TE mode interaction with the air.

In the presentation of Equations 1, 2, 4 and 5 (which are the equations describing the horizontal components of the fields) in FIGS. 5A, 5B, 5D and 5E, the equations are shown split over four lines of text with each line of text having a left and a right component. The left component on each line is marked "TM" and results from the TM mode component of the transmitted signal and the right component is marked "TE" and results from the TE mode component of the transmitted signal.

As previously noted, the airwave component is principally due to the interaction of the TE mode with the air, i.e. determined by the $R_A^{TE}$ coefficient. As can be seen form Equations 1 and 2, $E_r$ and $E_\phi$ include both TM and TE components and so are affected by the airwave. This is why known methods of analysing results from CSEM surveys which are based on electric field amplitude enhancement do not work well in shallow water.

Equation 7, shown in FIG. 5G, defines a linear combination of a vertical gradient in the radial electric field data $E_r$ and the azimuthal magnetic field data $B_\phi$ used in a method of analysing results according to a first embodiment of the invention. Combinations of the electric and magnetic field data such as this are referred to as combined response data.

Equation 8, shown in FIG. 5H, defines another linear combination of the vertical gradient in the azimuthal electric field data $E_\phi$ and the radial magnetic field data $B_r$ used in a method of analysing results according to a second embodiment of the invention.

One way of obtaining the vertical gradients in the electric field data is by sampling the electric field at two (or more) different heights during surveying, for example by deploying multiple receivers at different heights or a single receiver having multiple detectors at different heights.

Figure 6A:
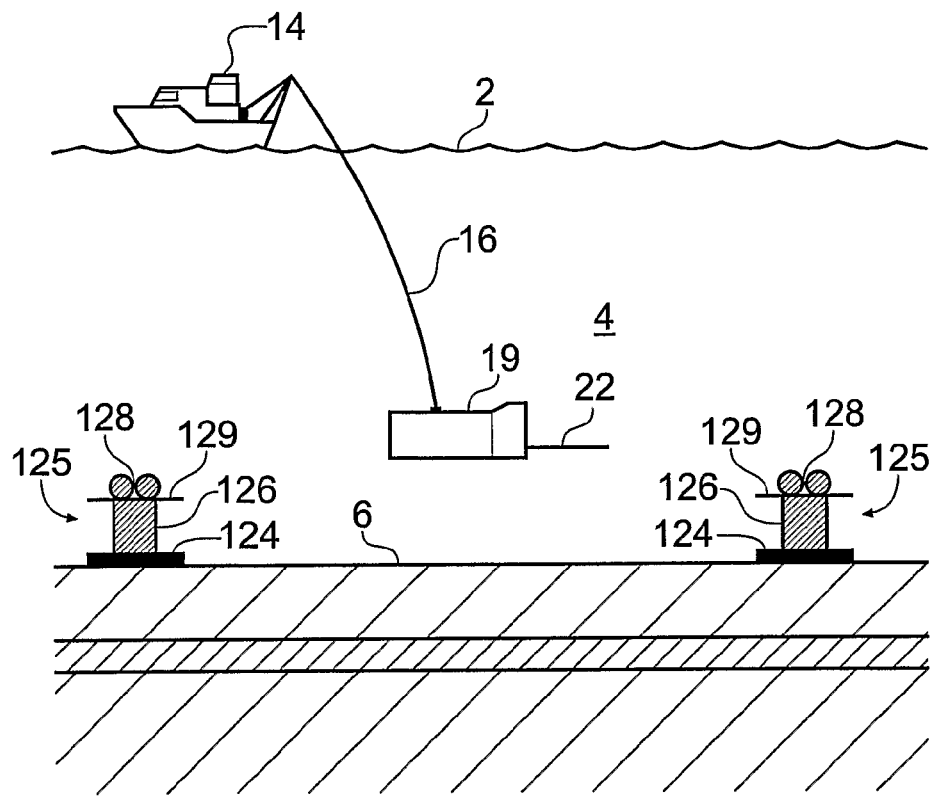
FIG. 6A schematically shows in vertical section a surface vessel undertaking an EM survey according to an embodiment of the invention.

FIG. 6A schematically shows a surface vessel 14 undertaking controlled source electromagnetic (CSEM) surveying of a subterranean strata configuration using a survey method according to one embodiment of the invention. The surface vessel 14 floats on the surface 2 of a body of water, in this case seawater 4 of depth h meters. A submersible vehicle 19 carrying a source in the form of an HED transmitter 22 is attached to the surface vessel 14 by an umbilical cable 16 providing an electrical and mechanical connection between the submersible vehicle 19 and the surface vessel 14. The HED transmitter is supplied with a drive current so that it broadcasts an HED EM signal into the seawater 4. The HED transmitter is positioned a height z' (typically around 50 meters) above the seafloor 6. The surface vessel 14, submarine 19, umbilical 16 and HED transmitter 22 may be conventional.

One or more remote receivers 125 are located on the seafloor 6. Each of the receivers 25 includes an instrument package 126, a lower detector 124, an upper detector 129, a floatation device 128 and a ballast weight (not shown). The upper and lower detectors 124, 129 each comprises an orthogonal pair of horizontal electric dipole detectors and an orthogonal pair of horizontal magnetic field detectors. The horizontal electric dipole detectors are sensitive to horizontal components of the electric fields induced by the HED transmitter in the vicinity of the receiver 125, and produce electric field detector signals therefrom. The horizontal magnetic field detectors are sensitive to horizontal components of the magnetic fields, for example the magnetic flux density, induced by the HED transmitter in the vicinity of the receiver 125, and produce magnetic field detector signals therefrom. The instrument package 126 records the detector signals for later analysis. The lower detector is positioned a height $z_1$ above the seafloor 6 and the upper detector is positioned at a height $z_u$. Typically the difference between $z_1$ ad $z_u$ will be around 10 meters, though other separations may also be used. A comparison of signals measured by the upper and lower detectors 129, 124 allows a gradient in electric field data to be determined based on their vertical separation. Although in this example, the upper and lower detectors 124, 129 are substantially identical. It will be appreciated that in other examples they may be different, for example, one or other of them might not include magnetic field detectors. In some examples detectors at more than two height may be used.

Because of the reciprocity between receiver and transmitter, vertical gradients in electric field data can also be determined from data collected by a receiver having a detector positioned at only a single height, but from a source having transmitters positioned at different heights, for example two or more different heights.

Figure 6B:
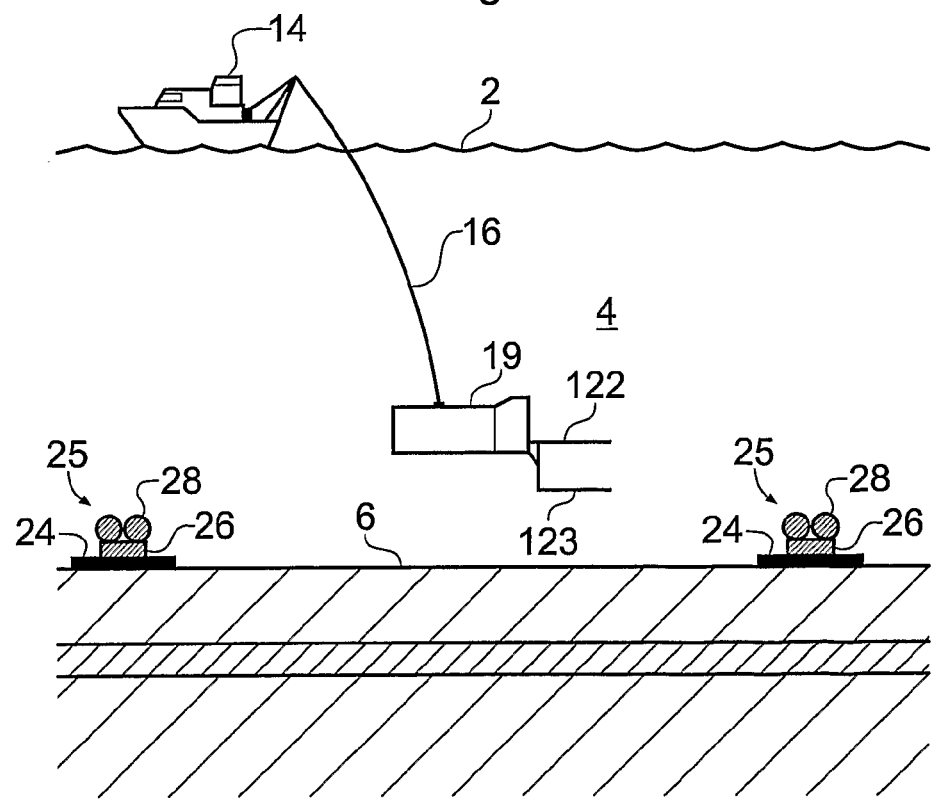
FIG. 6B schematically shows in vertical section a surface vessel undertaking an EM survey according to another embodiment of the invention.

FIG. 6B schematically shows a surface vessel 14 undertaking controlled source electromagnetic (CSEM) surveying of a subterranean strata configuration using a survey method according to another embodiment of the invention. The surface vessel 14 floats on the surface 2 of a body of water, in this case seawater 4 of depth h meters. A submersible vehicle 19 tows an electromagnetic source comprising an upper HED transmitter 122 and a lower HED transmitter 123. The submarine is attached to the surface vessel 14 by an umbilical cable 16 providing an electrical and mechanical connection between the submersible vehicle 19 and the surface vessel 14. The HED transmitters comprising the source are supplied with drive currents so that they broadcasts HED electromagnetic signals into the seawater 4. The upper HED transmitter 122 is positioned a height $z_u'$ (typically around 50 meters) above the seafloor 6. The lower HED transmitter 123 is positioned a height $z_1'$ (typically around 10 meters lower than the upper HED transmitter 122). In other example, the upper and lower transmitters may be towed by separate submersible vehicles.

One or more remote receivers 25 are located on the seafloor 6. Each of the receivers 25 include an instrument package 26, a detector 24, a floatation device 28 and a ballast weight (not shown). The detector 24 comprises an orthogonal pair of horizontal electric dipole detectors and an orthogonal pair of horizontal magnetic field detectors positioned a height z above the seafloor 6. The horizontal electric dipole detectors are sensitive to horizontal components of the electric fields induced by the HED transmitter in the vicinity of the receiver 25, and produce electric field detector signals therefrom. The horizontal magnetic field detectors are sensitive to horizontal components of the magnetic fields, for example the magnetic flux density, induced by the HED transmitter in the vicinity of the receiver 25, and produce magnetic field detector signals therefrom. The instrument package 26 records the detector signals for later analysis.

During surveying, the upper and lower HED transmitters may be driven alternately at the same frequency, or simultaneously at different frequencies such that the instrument package can distinguish signals received from each one. A comparison of signals measured from the upper and lower HED transmitters 122, 123 allows a gradient in electric field data to be determined based on the vertical separation of the transmitters.

In other examples, a vertical gradient in the electric field data may be obtained by using conventional receivers and a conventional HED transmitter which is towed along a path at one height, for example 50 meters above the seafloor, and then subsequently towed so as to re-trace at least portions of path at a different height, for example around 10 meters higher or lower.

It is also possible to use standard survey apparatus which provides electric and magnetic field data at a single height z at, or near, the seafloor for a single HED transmitter at a height z' above the seafloor. One benefit of this approach is that data previously collected using conventional survey methods may be analysed using methods according to the present invention. One way to determine vertical gradients in the electric field using such data is to compare the data with data simulated using a background model. This can be done, for example, to provide a boundary condition which may be applied to the data. For example, the electric fields at the seawater-air boundary interface may be modelled and from this, and the depth of the seawater, an estimate of the vertical gradient in the electric field may be determined. Alternatively, gradients in the electric field may be inferred by comparing data from a pair of receivers as the HED transmitter moves from being positioned above one receiver to being positioned above the other.

Figure 7A:
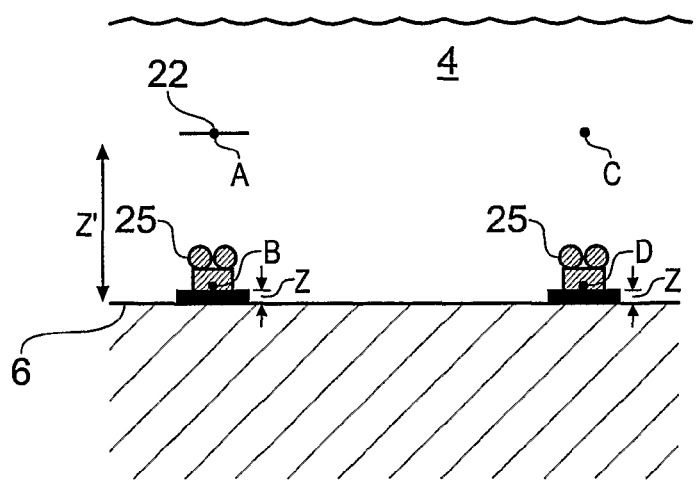
FIG. 7A schematically shows in vertical section a survey using similar equipment to that shown in FIG. 1.

FIG. 7A schematically shows in vertical section a CSEM survey made using equipment similar to that shown in FIG. 1. There are two receivers 25, one located at position B and one located at position D. The detectors for each receiver are at a height z above the seafloor 6 (i.e. z is the effective height at which the electric field and magnetic flux density are measured). The HED transmitter 22 is at a position A. Position A is directly above position B at a height z' above the seafloor 6. Also marked is a position C directly above position D, again at a height z' above the seafloor 6. The receivers at locations B and D are separated by a distance r. In this configuration, we consider the electric fields and magnetic flux densities measured by the receiver at D (i.e. at a height z above the seafloor) in response to the broadcast signal from the HED transmitter at A.

Figure 7B:
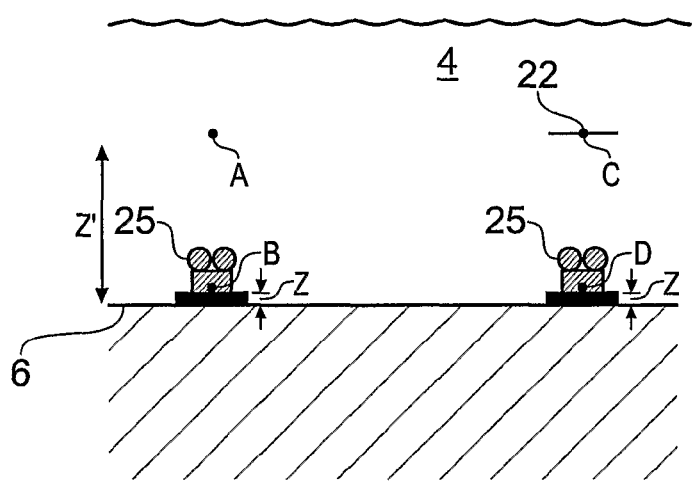
FIG. 7B schematically shows in vertical section the survey shown in FIG. 7A at a later time.

FIG. 7B is similar to FIG. 7A but corresponds to a later time, the HED transmitter having moved from location A to location C during its tow. In this configuration, we consider the electric fields and magnetic flux densities measured by the receiver at B (again at a height z above the seafloor) in response to the broadcast signal from the HED transmitter at C. Because of the reciprocity between transmitter and receiver, this configuration is equivalent to a configuration in which the transmitter and receiver positions are swapped. That is to say, FIG. 7B corresponds to a transmitter at location B and a receiver at location C. Accordingly, this configuration provides data equivalent to having a receiver at a height z' above the seafloor and a transmitter at a height z above the sea floor over the same horizontal range r as shown in FIG. 7A. Using a far-field approximation (i.e. where skin depth dominate in the seawater), the transmitter at B (height z) can be effectively converted into a transmitter at A (height z') by scaling the measured field amplitudes and shifting their phase by appropriate amounts. For example, to a first approximation an amplitude scaling factor and shift in phase calculated using the EM signal skin depth in the seawater or in a medium with an apparent resistivity calculated from the measured of electric and magnetic field, may be used. Following this adjustment, the data seen for the configuration shown in FIG. 7B is equivalent to that which would be seen with the HED transmitter at location A and the receiver at location C. This data can then be compared with data collected for the configuration shown in FIG. 7A (i.e. transmitter at location A, receiver at location D) to provide the necessary gradients in the fields over the height range z' to z. In addition, it is noted that since the vertical gradient is calculated using data from two different receivers with two different transmitter positions, the noise in the two data sets will be incoherent. As a consequence, the noise level in the vertical gradient can be reduced.

Although the horizontal field components of electric field and magnetic flux density are both TM and TE dependant, the combinations shown in Equations 7 and 8 depend only on the TM mode. For this reason the combined response data defined by Equations 7 and 8 are referred to as TM mode decomposition data. In particular, because the TM mode decomposition shown in Equation 7 is maximum for inline orientations (i.e. $\cos(\phi)$ dependence), it is referred to as inline TM mode decomposition data. Because the TM mode decomposition shown in Equation 8 is maximum for broadside orientations (i.e. $\sin(\phi)$ dependence), it is referred to as broadside TM mode decomposition data. There are two significant benefits which are provided by combining the electric and magnetic field data in this way. Firstly, because the TM mode decomposition data does not include any dependence on the TE mode, the TM mode decomposition data is much less sensitive to the airwave component which prevents conventional analysis methods from working well in shallow water. Secondly, because Equation 8 provides combined response data having solely a TM mode component for broadside orientations, response data which are sensitive to the presence of a subterranean hydrocarbon reservoir may be obtained for broadside, as well as inline, transmitter-receiver orientations. This greatly increases the amount of useful data which can be obtained during a survey. Between them, Equations 7 and 8 can provide combined response data for all transmitter-receiver orientations.

Figure 8:
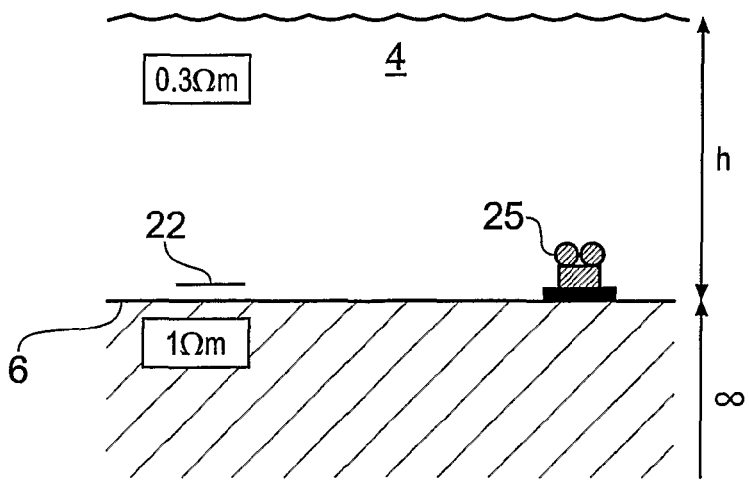
FIG. 8 shows in schematic vertical section a model uniform background subterranean strata configuration.

FIG. 8 shows in schematic vertical section a model background subterranean strata configuration. The configuration comprises a section of seafloor 6 beneath a depth h of seawater 4. The seawater has a resistivity of 0.3 $\Omega$m. Beneath the seafloor 6 is a uniform half-space sedimentary structure with a resistivity of 1 $\Omega$m, the low resistivity being primarily due to aqueous saturation of pore spaces. This background subterranean strata configuration extends uniformly downwards for an infinite extent. Also indicated in FIG. 8 are an HED transmitter 22, and a receiver 25 of the kind shown in FIG. 1. The distance between the HED transmitter and the receiver (i.e. the separation or range) is r km. The receiver is aligned inline (i.e. $\phi=0$) with the HED transmitter.

Figure 9A:
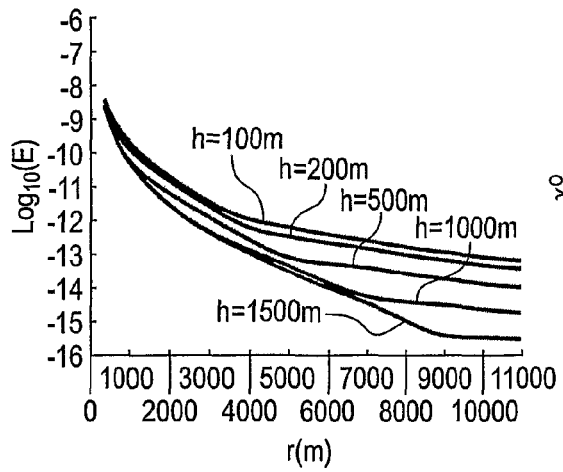
FIGS. 9A and 9B show the modelled amplitude and phase of the radial component of electric field data collected during an EM survey of the model subterranean strata configuration shown in FIG. 8 for a range of water depths.

FIG. 9A is a graph schematically showing the logarithm of the modelled radial electric field component amplitude, $\log_{10}(E)$, seen at the receiver 25 in response to the HED transmitter 22 broadcast signal as a function of separation, r, between the transmitter and the receiver. This is the field component previously used as the basis for the analysis of CSEM survey data and is shown here for comparison purposes. Curves are calculated for a number of different water depths (H=1500 m, 1000 m, 500 m, 200 m and 100 m) as indicated on the figure. The HED transmitter is driven by an AC drive signal at a frequency of 0.25 Hz and the electric fields are calculated per unit transmitter electric dipole moment. FIG. 9A demonstrates how the radial component of the electric field given by Equation 1 becomes increasingly dominated by the airwave component of the transmitted signal in shallower water. For example, at a separation of around 9000 m, the calculated radial electric field is approximately 300-times greater in a water depth of 100 m than in a water depth of 1500 m. This is due to the increased relative contribution of the airwave component. Even at separations of only around 2000 m, the increased airwave contribution seen with a water depth of 100 m leads to radial electric fields which are around ten-times greater than those seen in deeper waters.

Figure 9B:
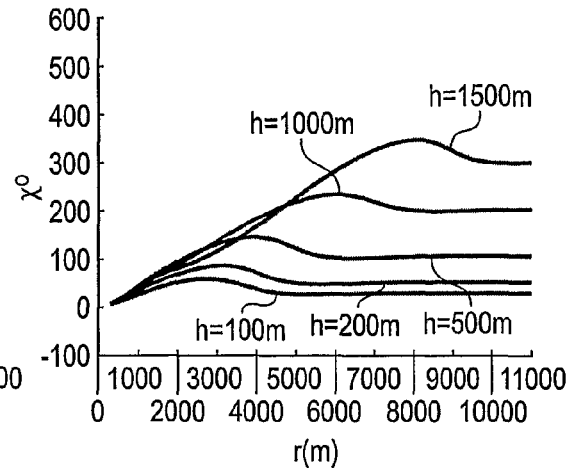

FIG. 9B is a graph schematically showing the phase, $\chi$, relative to the HED transmitter AC drive signal, of the modelled radial electric field components plotted in FIG. 9A. It is apparent from FIG. 9B that with a finite water depth there is little advance in phase with increasing separation once the airwave component begins to dominate, for example at beyond around r=2000 m for h=100 m. This is because a dominant component of the signal is travelling through the non-conducting air.

Figure 10A:
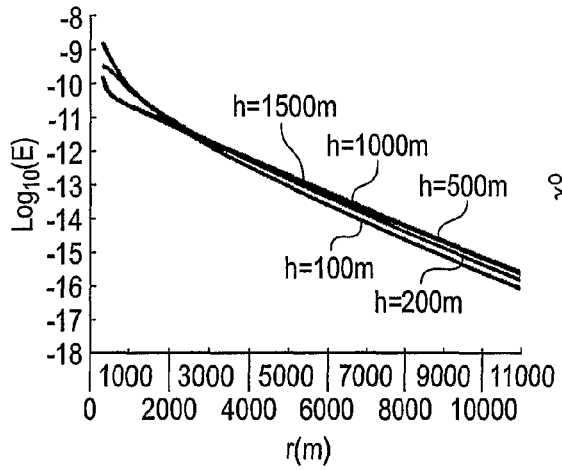
FIGS. 10A and 10B show the modelled amplitude and phase of a combination of electric and magnetic field data collected during an EM survey which provides inline TM mode decomposition data according to a first embodiment of the invention for a range of water depths.

FIG. 10A is a graph schematically showing the logarithm of the modelled inline TM mode decomposition given by Equation 7 seen at the receiver 25 in response to the HED transmitter 22 broadcast signal multiplied by transmitter-receiver separation, r, as a function of this separation. The multiplication by r provides for an equivalent electric field parameterisation of the TM mode decomposition. As with FIG. 9A, curves are calculated for a number of different water depths h. The HED transmitter is again driven by an AC drive signal at a frequency of 0.25 Hz and the TM mode decomposition calculated per unit transmitter electric dipole moment. It is clear from FIG. 10A that, unlike FIG. 9A, there is little difference between the curves for the different water depths. This reflects the fact that the TM mode decomposition does not include a TE mode dependence which is the mode which contributes most to the airwave component.

Figure 10B:
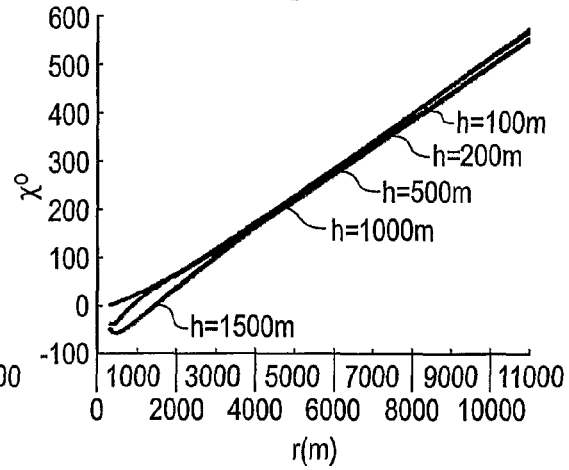

FIG. 10B is a graph schematically showing the phase, $\chi$, relative to the HED transmitter AC drive signal, of the modelled TM mode decomposition plotted in FIG. 10A. It is apparent from FIG. 10B that the phase advances steadily with increasing separation for all water depths. This again demonstrates the insensitivity of the TM mode decomposition given by Equation 7 to the airwave component in shallow water.

Figure 10C:
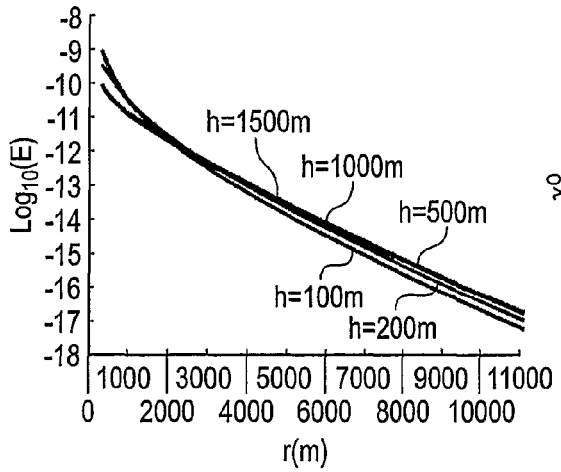
FIGS. 10C and 10D show the modelled amplitude and phase of a combination of electric and magnetic field data collected during an EM survey which provides broadside TM mode decomposition data according to a second embodiment of the invention for a range of water depths.
Figure 10D:
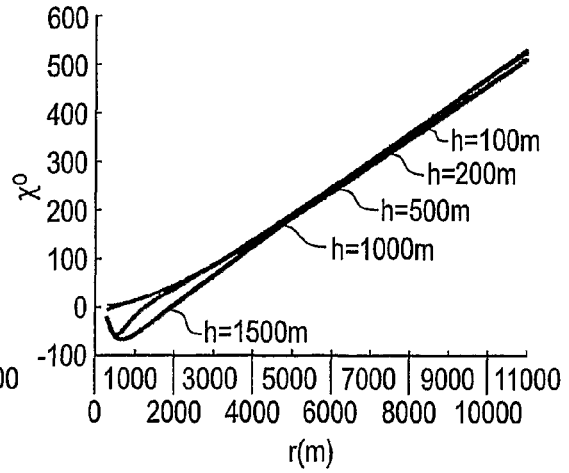

FIGS. 10C and 10D are similar to and will be understood from FIGS. 10A and 10B respectively. However, whereas FIGS. 10A and 10B show the behaviour of the modelled inline TM mode decomposition given by Equation 7 for the subterranean strata configuration shown in FIG. 8, FIGS. 10C and 10D show the behaviour of the modelled broadside TM mode decomposition given by Equation 8. This is for the same subterranean strata configuration shown in FIG. 8, but in which the receiver is now aligned broadside (i.e. ϕ=90) to the HED transmitter.

This demonstration that both the inline and broadside TM mode decompositions are not significantly effected by the airwave component in shallow water is made using the model background subterranean strata configuration shown in FIG. 8. This model does not contain a hydrocarbon reservoir. It is, therefore, important to show that the TM mode decompositions are sensitive to the presence of a hydrocarbon reservoir if they are to be of practical use.

Figure 11:
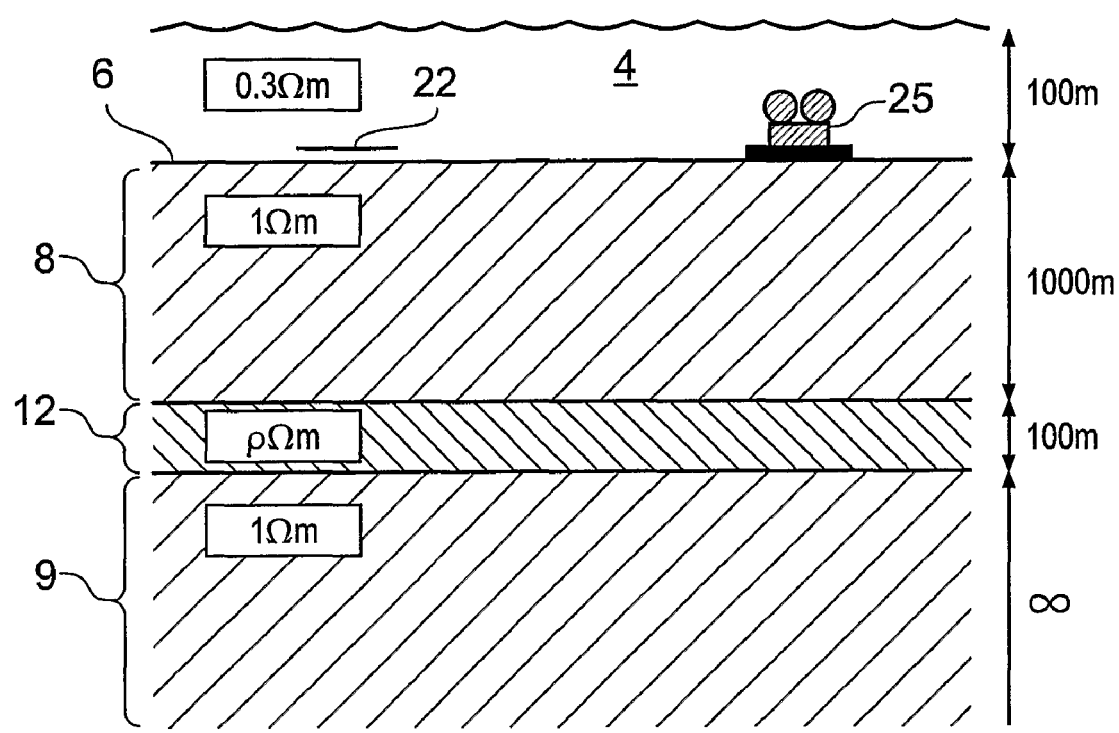
FIG. 11 shows in schematic vertical section a model hydrocarbon-reservoir bearing subterranean strata configuration.

FIG. 11 shows in schematic vertical section a model hydrocarbon-reservoir subterranean strata configuration. A section of seafloor 6 lies beneath a 100 m depth of seawater 4 which has a resistivity of 0.3 Ωm. The strata configuration beneath the seafloor 6 comprises a 1000 m thick overburden layer 8, representing sediments, arranged above a hydrocarbon reservoir 12. The overburden layer 8 has a resistivity of 1 Ωm, again, primarily due to aqueous saturation of pore spaces. The hydrocarbon reservoir 12 is 100 m thick, and has a resistivity of ρΩm. This resistivity will typically be greater than that of the surrounding layers due to the presence of non-conducting hydrocarbon within pore spaces. Below the hydrocarbon reservoir 12 is a sedimentary underburden layer 9, which, as for the overburden layer, has a resistivity of 1 Ωm. The underburden layer extends downwardly for an effectively infinite extent. Accordingly, except for the presence or absence of the hydrocarbon reservoir 12, the hydrocarbon-reservoir subterranean strata configuration of FIG. 11 is identical to the background subterranean strata configuration of FIG. 8 for the case h=100 m. An HED transmitter 22 and a receiver 25 are again shown.

Figure 12A:
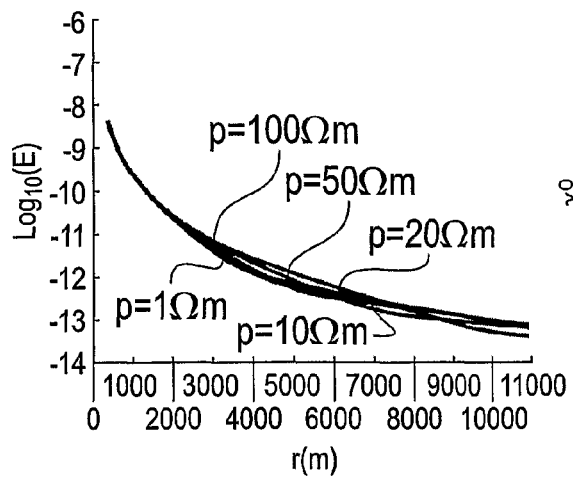
FIGS. 12A and 12B show the modelled amplitude and phase of the radial component of electric field data collected during an EM survey of the model subterranean strata configuration shown in FIG. 11 for a range of hydrocarbon-reservoir resistivities.

FIG. 12A is a graph schematically showing the logarithm of the modelled radial electric field component amplitude, $Log_{10}(E)$, seen at the receiver 25 in response to the HED transmitter 22 broadcast signal as a function of separation, r, between the transmitter and the receiver with the hydrocarbon-reservoir subterranean reservoir shown in FIG. 11. This field component is again shown for comparison purposes. Curves are calculated for a number of different resistivities p for the hydrocarbon reservoir (ρ=1 Ωm (i.e. effectively no detectable reservoir), 10 Ωm, 20 Ωm, 50 Ωm and 100 Ωm) as indicated on the figure. The HED transmitter is again driven by an AC drive signal at a frequency of 0.25 Hz and the electric fields are calculated per unit transmitter electric dipole moment. The curves shown in FIG. 12A are all very similar to one another, even though there is a wide range of hydrocarbon resistivities. This is because with a water depth of only 100 m, the radial electric field component is dominated by the airwave component of the TE mode and cannot be used to properly identify the presence or not of a hydrocarbon reservoir.

Figure 12B:
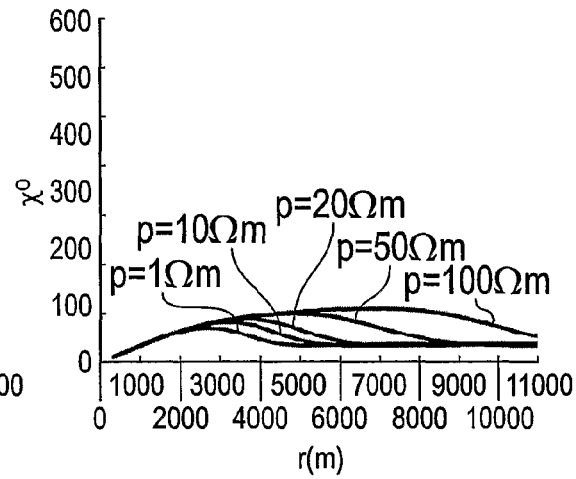

FIG. 12B is a graph schematically showing the phase, χ, relative to the HED transmitter AC drive signal, of the modelled radial electric field components plotted in FIG. 12A. It is apparent from FIG. 12B that there is little advance in phase with increasing separation for all hydrocarbon reservoir resistivities. This is again because a dominant component of the transmitted signal is travelling through the non-conducting air.

Figure 13A:
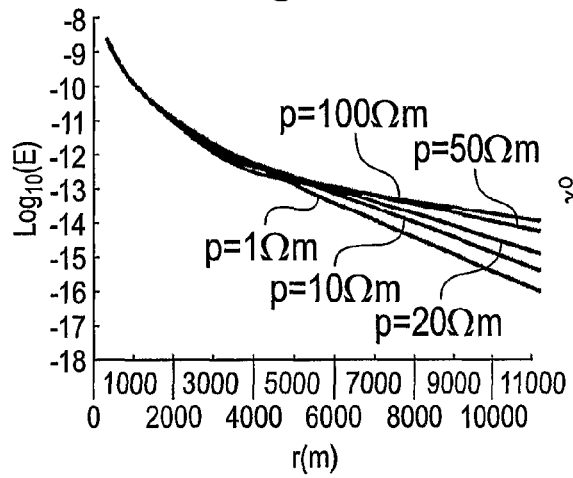
FIGS. 13A and 13B show the modelled amplitude and phase of the inline TM mode decomposition data for an EM survey of the model subterranean strata configuration shown in FIG. 11 for a range of hydrocarbon-reservoir resistivities.

FIG. 13A is a graph schematically showing the logarithm of the modelled inline TM mode decomposition seen at the receiver 25 in response to the HED transmitter 22 broadcast signal multiplied by transmitter-receiver separation as a function of this separation for the hydrocarbon-reservoir subterranean strata configuration of FIG. 11. As before, the multiplication by r provides an equivalent electric field parameterisation of the TM mode decomposition. As with FIG. 12A, curves are calculated for a number of different hydrocarbon reservoir resistivities. The HED transmitter is again driven by an AC drive signal at a frequency of 0.25 Hz and the TM mode decomposition calculated per unit transmitter electric dipole moment. It is clear from FIG. 13A that, unlike the airwave dominated radial electric field curves of FIG. 12A, there is a strong dependence in the calculated response of the inline TM mode decomposition on the resistivity of the hydrocarbon reservoir, even though the seawater depth is only 100 m. For a hydrocarbon-reservoir resistivity of ρ=100 Ωm, the inline TM mode decomposition signal is around 100-times greater at a separation of r=11000 m than for the case ρ=1 Ωm (i.e. effectively no detectable hydrocarbon reservoir). This clearly demonstrates the sensitivity of the inline TM mode decomposition to the presence or not of a hydrocarbon reservoir.

Figure 13B:
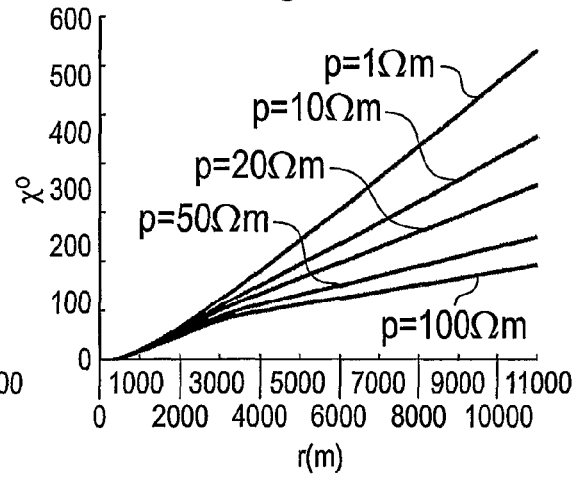

FIG. 13B is a graph schematically showing the phase, χ, relative to the HED transmitter AC drive signal, of the modelled TM mode decomposition plotted in FIG. 13A. It is apparent from FIG. 13B that the phase advances at different rates for different hydrocarbon-reservoir resistivities. This again demonstrates the sensitivity of the inline TM mode decomposition given by Equation 7 to the presence of a hydrocarbon reservoir.

Figure 13C:
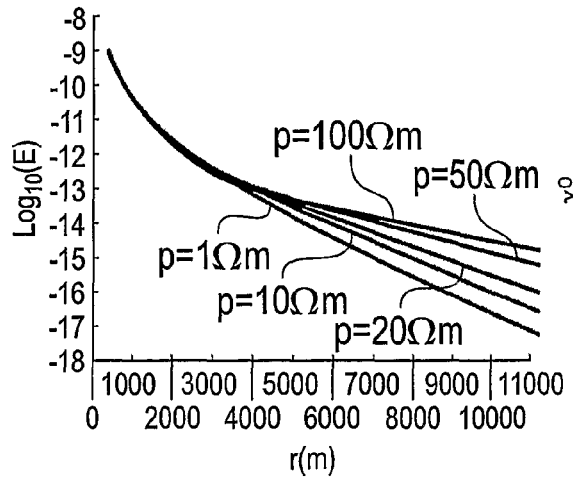
FIGS. 13C and 13D show the modelled amplitude and phase of the broadside TM mode decomposition data for an EM survey of the model subterranean strata configuration shown in FIG. 11 for a range of hydrocarbon-reservoir resistivities.
Figure 13D:
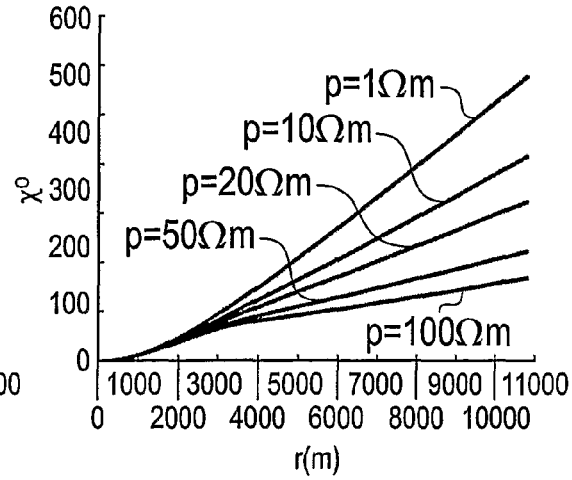

FIGS. 13C and 13D are similar to and will be understood from FIGS. 13A and 13B respectively. However, whereas FIGS. 13A and 13B show the behaviour of the modelled inline TM mode decomposition given by Equation 7 for the subterranean strata configuration shown in FIG. 11, FIGS. 13C and 13D show the behaviour of the modelled broadside TM mode decomposition given by Equation 8 multiplied by the transmitter-receiver separation in order to provide an equivalent electric field. This is for the same subterranean strata configuration as shown in FIG. 11, but in which the receiver is now aligned broadside (i.e. ϕ=90) to the HED transmitter.

It can be seen from FIGS. 13C and 13D that there is also a strong dependence in the calculated response of the broadside TM mode decomposition on the resistivity of the hydrocarbon reservoir. For a hydrocarbon-reservoir resistivity of 100 Ωm, the broadside TM mode decomposition signal is around 300-times greater at a separation of r=11000 m than for the case ρ=1 Ωm. This clearly demonstrates the sensitivity of the broadside TM mode decomposition to the presence or not of a hydrocarbon reservoir.

Figure 14A:
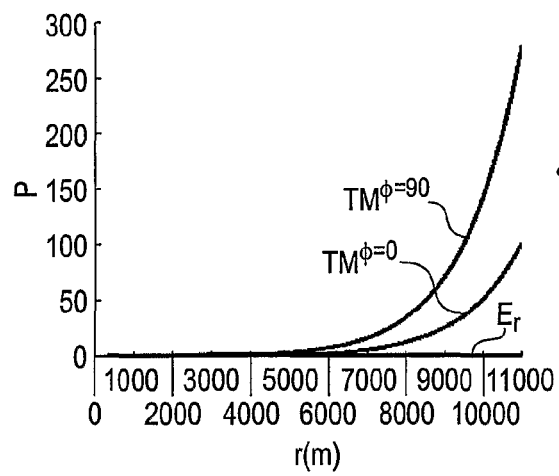
FIG. 14A is a graph schematically showing the ratio of the curves plotted in FIGS. 12A (radial electric field component), 13A (inline TM mode decomposition) and 13C (broadside TM mode decomposition) for a hydrocarbon reservoir of resistivity $\rho=100$ $\Omega$m to the corresponding curves for which there is no detectable hydrocarbon reservoir.

FIG. 14A is a graph schematically showing the ratio P of the curves plotted in FIGS. 12A (radial electric field component), 13A (inline TM mode decomposition) and 13C (broadside TM mode decomposition) for a hydrocarbon reservoir of resistivity ρ=100 Ωm to the corresponding curves for which there is no detectable hydrocarbon reservoir (i.e. ρ=1 Ωm). The curves are marked $E_r$, $TM^{\Phi=0}$ and $TM^{\Phi=90}$ for the radial electric field, inline TM mode decomposition and broadside TM mode decomposition respectively. FIG. 14A demonstrates the sensitivity of both the inline and broadside TM mode decompositions to the presence of the hydrocarbon reservoir as a function of separation r. This is apparent from the large diversions from unity for these curves. As noted above, at a separation of r=11000 m, the inline TM mode decomposition is around 100-times greater, and the broadside TM mode decomposition is around 300-times greater with a ρ=100 Ωm hydrocarbon reservoir than when there is no detectable hydrocarbon reservoir (i.e. ρ=1 Ωm). The insensitivity of the radial electric field component to the presence of the hydrocarbon reservoir (due to the airwave component dominating the signal) is also clear.

Figure 14B:
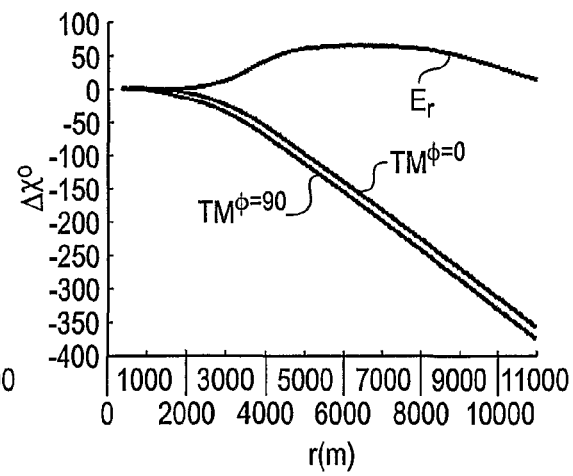
FIG. 14B is a graph schematically showing the difference in phase between the curves plotted in FIGS. 12B (radial electric field component), 13B (inline TM mode decomposition) and 13D (broadside TM mode decomposition) for a hydrocarbon reservoir of resistivity $\rho=100$ $\Omega$m and the respectively corresponding curves for which there is no detectable hydrocarbon reservoir.

FIG. 14B is a graph schematically showing the difference in phase $\Delta\chi$ between the curves plotted in FIGS. 12B (radial electric field component), 13B (inline TM mode decomposition) and 13D (broadside TM mode decomposition) for a hydrocarbon reservoir of resistivity $\rho=100$ $\Omega$m and the respectively corresponding curves for which there is no detectable hydrocarbon reservoir (i.e. $\rho=1$ $\Omega$m). The curves are marked $E_r$, $TM^{\Phi=0}$ and $TM^{\Phi=90}$ for the radial electric field, inline TM mode decomposition and broadside TM mode decomposition respectively. FIG. 14B again demonstrates the sensitivity of both the inline and broadside TM mode decompositions to the presence of the hydrocarbon reservoir as a function of separation r. This is apparent from the progressive increase in the absolute value of $\Delta\chi$. The relative insensitivity of the radial electric field component to the presence of the hydrocarbon reservoir is again seen.

Figure 14C:
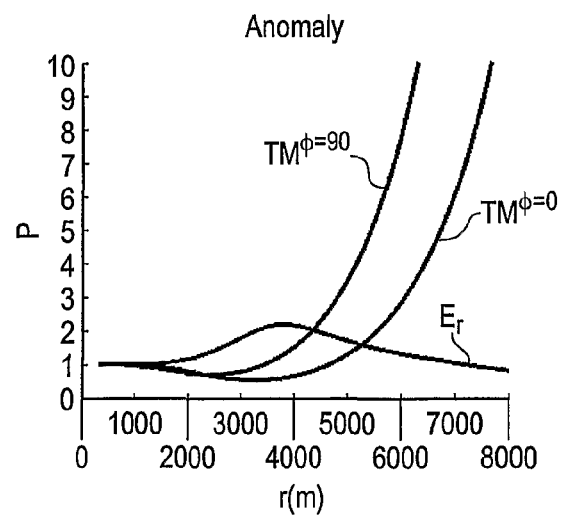
FIG. 14C is a graph schematically showing the same curves as shown in FIG. 14A, but on a magnified scale.

FIG. 14C is a graph schematically showing the same curves as shown in FIG. 14A, but on a magnified scale. This more clearly demonstrates the sensitivity of the inline and broadside TM mode decompositions to the presence of the hydrocarbon reservoir at smaller separations r than can be seen on the scale of FIG. 14A.

Curves of the kind shown in FIGS. 12 to 14 which are derived from actual CSEM response data can be further analysed using standard techniques, for example, geophysical inversion, to produce subterranean resistivity maps of the area being surveyed. These analysis techniques can be broadly similar to techniques previously used in deep water surveys for electric field data of the kind shown in FIG. 12A for conventional CSEM survey data analysis techniques for surveys, for example.

Because in practice, subterranean strata configurations are generally not as simple as those used in the model surveys described above, it is sometimes difficult to identify directly from curves of the type shown in FIGS. 13A, 13B, 13C and 13D obtained from real surveys whether the curves contain features indicative of a buried hydrocarbon reservoir or merely features relating to local larger scale background structures. In particular the kind of TM mode decomposition data seen with a thin resistive hydrocarbon reservoir embedded in a uniform resistivity background can be similar to that seen in a subterranean strata configuration comprising layers of increasing resistivity with depth. This kind of increasing-resistivity structure is a feature of some submarine sedimentary basins, for example, and can arise due to the progressive expulsion of conductive pore fluids with increasing depths by a rising overburden pressure. Accordingly knowledge of the large scale background structure of the subterranean strata in the area from which survey data are being analysed is often helpful in order to determine reliably whether features in TM mode decomposition data are caused by a buried hydrocarbon layer or whether they are caused by large scale background structures.

Figure 15A:
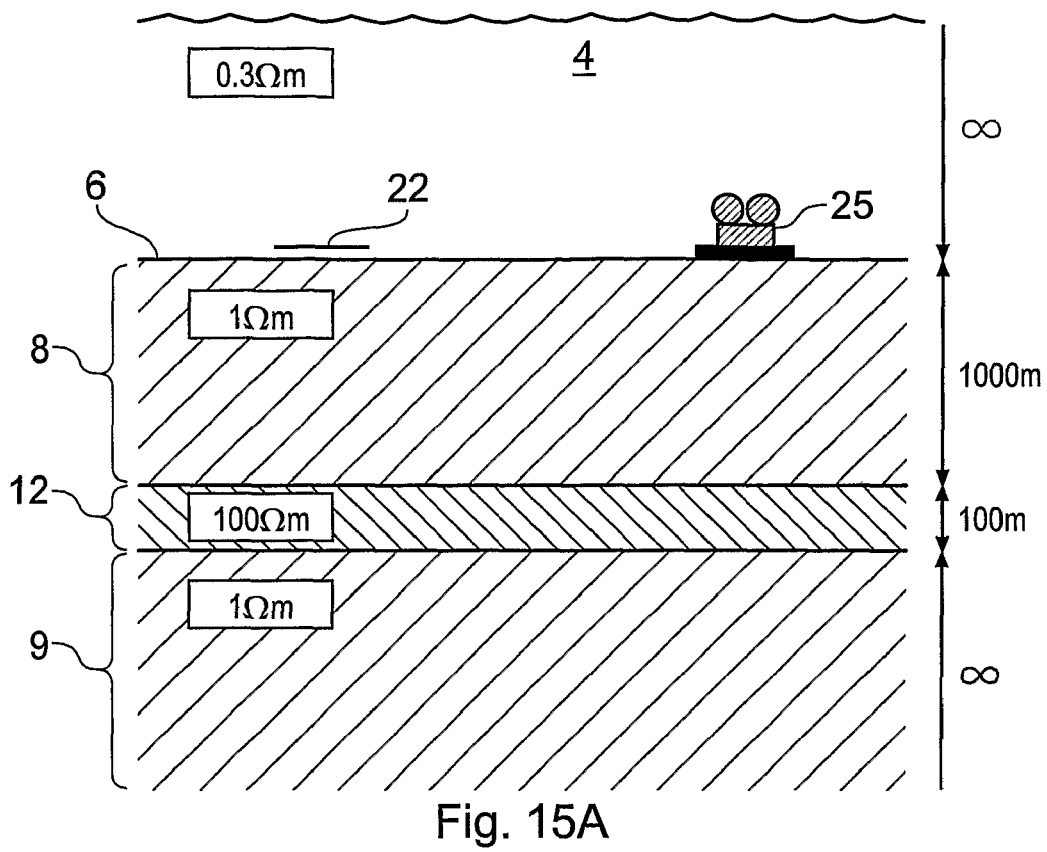
FIG. 15A shows in schematic vertical section another model hydrocarbon-reservoir bearing subterranean strata configuration.
Figure 15B:
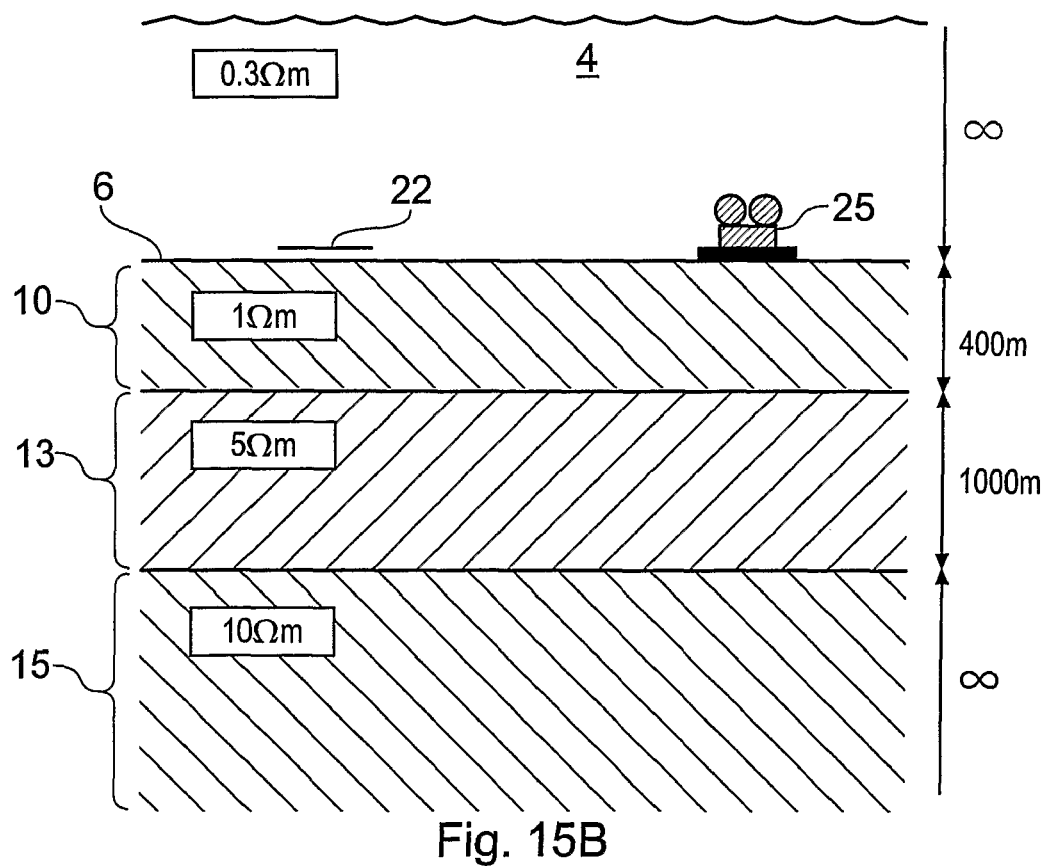
FIG. 15B shows in schematic vertical section a model increasing-resistivity subterranean strata configuration in which resistivity progressively increases with depth.

FIGS. 15A and 15B show two subterranean strata model configurations used to show the difficulty in distinguishing between a thin resistive hydrocarbon reservoir (FIG. 15A) and a steadily increasing resistivity with increasing depth (FIG. 15B). FIG. 15A shows a hydrocarbon-reservoir subterranean model configuration which is similar to that of FIG. 11 for the case where the hydrocarbon reservoir resistivity $\rho=100$ $\Omega$m. However, the model subterranean strata configuration of FIG. 15A includes an infinite depth of seawater, as opposed to the 100 m depth of seawater of FIG. 11. In the increasing-resistivity subterranean strata configuration model of FIG. 15B, a section of seafloor 6 lies beneath an infinite depth of seawater 4. The strata beneath the seafloor 6 comprise a series of sedimentary layers of increasing resistivity. A first layer 10 has a uniform resistivity of 1 $\Omega$m and a thickness of 400 m. A second layer 13 has a uniform resistivity of 5 $\Omega$m and a thickness of 1000 m. Beneath the second layer 13 is a third layer 15 which has a resistivity of 10 $\Omega$m and extends downwardly for an infinite extent. An HED transmitter 22 and a receiver 25 are also shown.

Figure 16:
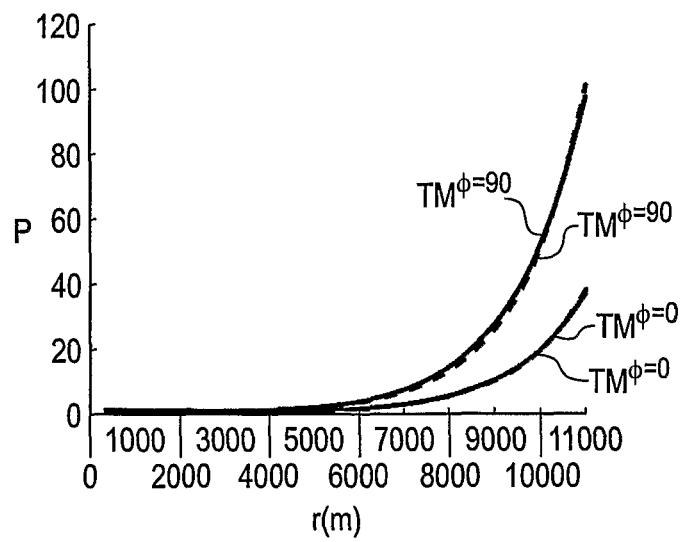
FIG. 16 is a graph schematically showing the ratios of the inline TM mode decomposition and the broadside TM mode decomposition calculated for both the model subterranean strata configurations shown in FIGS. 15A and 15B to those calculated for the background model subterranean strata configuration shown in FIG. 8 for infinite water depth.

FIG. 16 is a graph showing modelled curves for the inline and broadside TM mode decomposition data which are similar to and will be understood from the TM mode decomposition curves shown in FIG. 14A, but which are calculated for the hydrocarbon-reservoir subterranean strata configuration shown in FIG. 15A (solid lines) and for the increasing-resistivity subterranean strata configuration shown in FIG. 15B (dotted lines). It is clear that the inline TM mode decomposition data calculated for the hydrocarbon reservoir model (solid line marked $TM^{\Phi=0}$) are similar to the inline TM mode decomposition data calculated for the increasing resistivity model (dotted line marked $TM^{\Phi=0}$). Likewise, the broadside TM mode decomposition data calculated for the hydrocarbon reservoir model (solid line marked $TM^{\Phi=90}$) are similar to the broadside TM mode decomposition data calculated for the increasing resistivity model (dotted line marked $TM^{\Phi=90}$). This demonstrates the ambiguity that can arise with TM mode decomposition data when attempting to distinguish between a subterranean strata configuration having a hydrocarbon reservoir and some other large scale subterranean strata configurations.

Because of this possible ambiguity, analysis of survey data aimed at establishing whether a subterranean strata configuration contains a thin resistive hydrocarbon reservoir will normally involve combining electric and magnetic field data to generate TM mode decomposition data such as that defined by Equations 7 or 8. These response data are sensitive to the presence of subterranean hydrocarbon reservoirs, even in shallow seawater. However, in addition, to determine reliably whether features of the TM mode decomposition data are indicative of a hydrocarbon reservoir or of the local background structure, it is necessary to determine how the TM mode decomposition data for a given subterranean strata configuration would appear if there were no hydrocarbon reservoir.

This analysis step, generally referred to as normalisation, is usually done with the aid of background data. Background data are specific to the area being surveyed and can be obtained in a variety of ways. One way is to model the EM survey performed to obtain the TM mode decomposition data with a model background subterranean strata configuration. The background model should be as close a match as possible to the actual background structure in the area being surveyed. A comparison of the TM mode decomposition data with the background data provides difference data sensitive to the likely presence, extent and location of a subterranean hydrocarbon reservoir embedded within the background subterranean strata configuration. For example, if the TM mode decomposition data closely match the background data, there is unlikely to be a buried hydrocarbon layer. If, on the other hand, there are differences, i.e. anomalies, in the TM mode decomposition data compared to the background data, for example, an increased receiver signal amplitude, this could be quantitatively assessed in terms of being indicative of a buried hydrocarbon reservoir. The variation in anomalies at different horizontal separations provides information on the depth and extent of a hydrocarbon reservoir. For example, if differences between the TM mode decomposition data and the background data are only apparent at large transmitter-receiver horizontal separations, this is likely to indicate that the hydrocarbon reservoir is relatively deeply buried. Similarly, a discontinuity in TM mode decomposition data as a function of horizontal separation is likely to indicate a boundary or edge of a hydrocarbon reservoir at the location of the discontinuity.

Suitable background models to use in generating background data can be obtained in several ways.

One way of obtaining the information required to construct a suitable background model is with conventional MT electromagnetic surveying techniques. As noted above, these techniques are capable of providing information on large scale background resistivity structures, even though they unable to detect hydrocarbon reservoirs directly.

Another way of obtaining the information required to construct a suitable background model is from CSEM survey data. As described above, it is the TE mode component of a transmitted signal which can provide information on background structure is a CSEM survey. TE mode response may be obtained from a combination of the same electric and magnetic field data combined to provide the TM mode decomposition data.

Equation 9, shown in FIG. 17A, defines a linear combination of the radial electric field data $E_r$ and the vertical gradient in the azimuthal magnetic field data $B_\phi$. Equation 9 defines combined response data which include only a TE mode dependence and no TM mode dependence.

Equation 10, shown in FIG. 17B, defines a similar linear combination of the azimuthal electric field data $E_\phi$ and the vertical gradient in the radial magnetic field data $B_r$. This combined response data again includes only a TE mode dependence.

The vertical gradients in the magnetic field data may be obtained similarly to the vertical gradients in the electric field described above.

The combined response data given by Equation 9 is referred to as inline TE mode decomposition data and the combined response data shown in Equation 10 is referred to as broadside TE mode decomposition data.

Figure 18A:
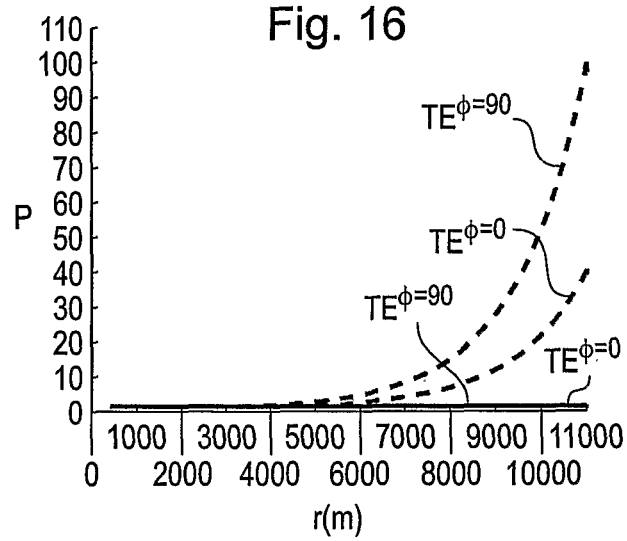
FIG. 18A is a graph schematically showing the ratios of an inline TE mode decomposition and a broadside TE mode decomposition calculated for both the model subterranean strata configurations shown in FIGS. 15A and 15B to those calculated for the background model subterranean strata configuration shown in FIG. 8 for infinite water depth.

FIG. 18A is a graph which is similar to and will be understood from FIG. 16. However, whereas FIG. 16 plots data for the inline and broadside TM mode decompositions calculated for the model subterranean strata shown in FIGS. 15A and 15B, FIG. 18A plots data for the inline and broadside TE mode decompositions calculated for the same model subterranean strata configurations. Curves calculated for the hydrocarbon-reservoir subterranean strata configuration shown in FIG. 15A are shown as solid lines and curves for the increasing-resistivity subterranean strata configuration shown in FIG. 15B are shown as dotted lines. It is clear that the inline TE mode decomposition data calculated for the hydrocarbon reservoir model (solid line marked $TE^{\phi=0}$) is very different to the inline TE mode decomposition data calculated for the increasing resistivity model (dotted line marked $TE^{\phi=0}$). Likewise, the broadside TE mode decomposition data calculated for the hydrocarbon reservoir model (solid line marked $TE^{\phi=90}$) is very different to the broadside TE mode decomposition data calculated for the increasing resistivity model (dotted line marked $TE^{\phi=90}$). This is because, as described above, the TE mode decomposition is insensitive to the hydrocarbon reservoir for both inline and broadside alignments.

Figure 18B:
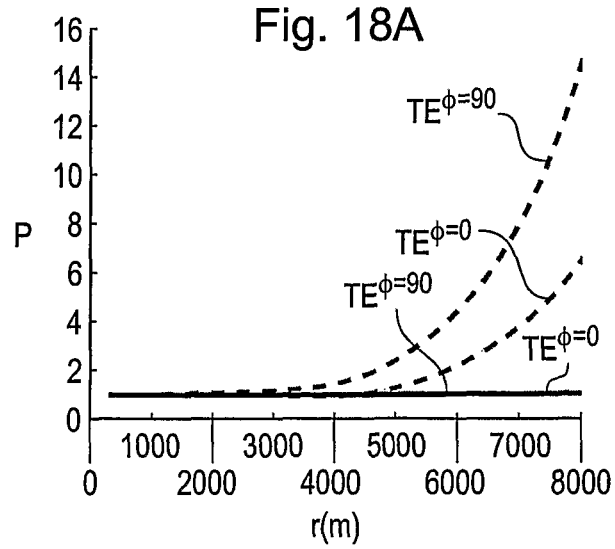
FIG. 18B is a graph schematically showing the same curves as shown in FIG. 18A, but on a magnified scale.

FIG. 18B is a graph schematically showing the same curves as shown in FIG. 18A, but on a magnified scale.

With conventional survey analysis methods relying on the amplitude of detected electric fields, the TE mode response is obtained by aligning the transmitter and the receiver in a broadside orientation. It is not possible with conventional survey analysis methods to determine the TE mode response at inline orientations.

Whilst in shallow water the use of TE mode decompositions in determining a background model is prone to the same difficulties associated with the airwave component described above, the impact of the airwave component can be reduced by employing relatively low frequency EM signals. Low frequency signals suffer less attenuation as they pass through the subterranean strata and so the airwave component is not so dominant in the EM fields induced at a receiver by an HED transmitter driven by a low frequency AC current. Because of this, low frequency signals are capable of providing information on large scale background resistivity structures needed to generate a background model.

In other cases, an area to be surveyed will already be very well characterized by previous surveying. For example, in a producing oilfield or oil province there is likely to be a wealth of existing seismic and well-log data. In these cases, background models can be calculated from a rock formation model. The rock formation model can be created from the seismic data and then resistivities assigned to the various components in the rock structure using the resistivities obtained from well-log data. (If directly applicable well-log data are not available, it may be possible to estimate resistivity values by comparison with resistivity data from nearby wells in similar geological structures.) This technique for obtaining the information required to construct a suitable background model will be especially suited to applications in existing oilfields, such as monitoring long term depletion of reserves.

When monitoring depletion, it may be sufficient to directly compare TM mode decomposition data taken at different times, e.g. several weeks or months apart, without use of a rock formation model. In other words, the background data used is data from a previous similar survey. Differences in TM mode decomposition data taken at different times are indicative of changes in the hydrocarbon reservoir which have occurred between the times at which the data were taken. Because of this, this kind of comparison provides a useful monitoring tool. The TM mode decomposition data taken at the earlier time thus effectively acts as background data for comparing with the TM mode decomposition data taken at the later time.

In addition to the insensitivity of the TM mode decompositions to the airwave component, another major benefit is that TM mode decompositions may be made with both inline (Equation 7) and broadside (Equation 8) orientations. Furthermore, because the TM mode decompositions are not mixed mode at any orientation, the response of the subterranean strata to the TM mode can be properly determined for all transmitter-receiver orientations, the only effect being an effective reduction in the transmitter dipole amplitude. At transmitter-receiver orientations which are closer to inline than broadside, the TM mode decomposition according to Equation 7 provides the greatest signal. At transmitter-receiver orientations which are closer to broadside than inline, the TM mode decomposition according to Equation 8 provides the greatest signal.

Similar considerations allow the response of the subterranean strata to the TE mode decomposition to be obtained for all transmitter-receiver orientations. This is useful where TE mode decomposition data are used for normalisation, for example when analysing survey data from a deep-water survey.

Because both TM and TE mode decomposition data can be obtained for all transmitter-receiver orientations, and not just the particular configuration required with conventional analysis methods, survey response data analysed according to the above described techniques can be obtained using much simpler tow paths than has previously been possible.

Figure 19:
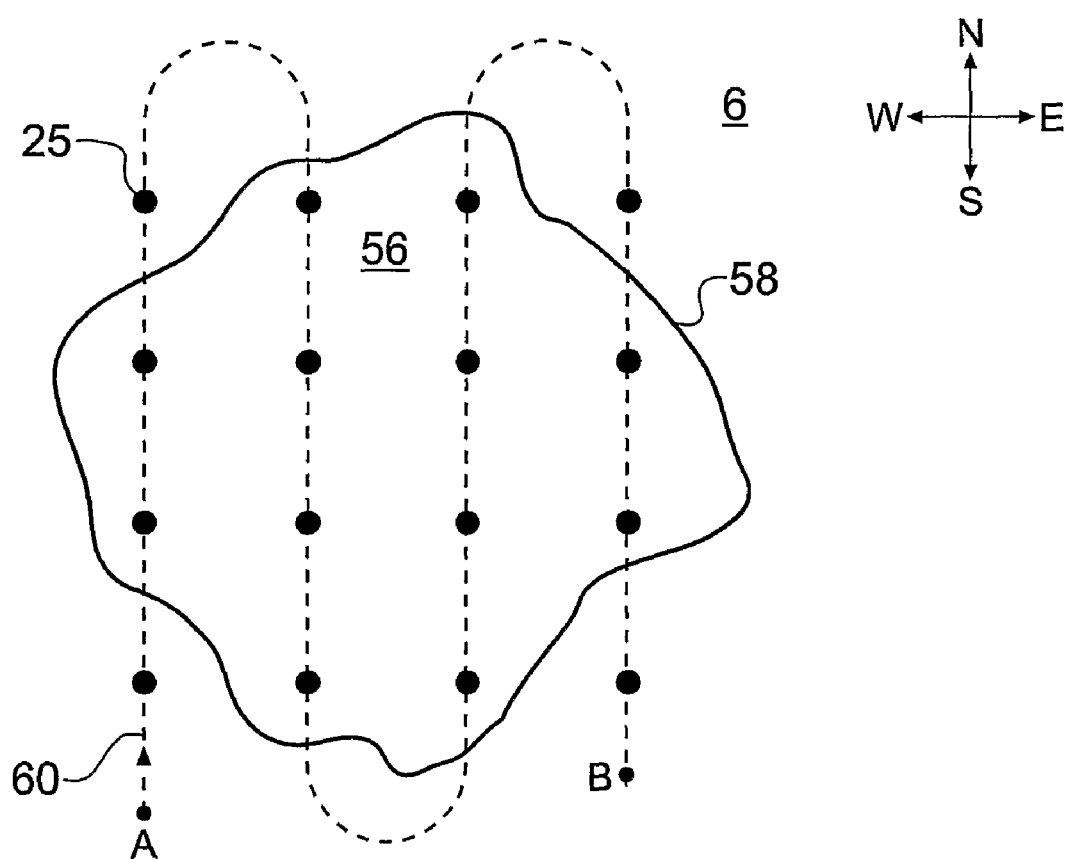
FIG. 19 is a schematic plan view showing an example survey geometry for obtaining electric and magnetic field data to be analysed according to embodiments of the invention in which sixteen receivers are laid out on a section of seafloor above a subterranean reservoir.

FIG. 19 is a schematic plan view showing an example layout of sixteen receivers 25 distributed across a section of seafloor 6 above a subterranean reservoir 56 during a survey for which data are to be analysed according to the above described TM mode decomposition techniques. The reservoir 56 has a linear extent on the order of several km and its boundary is indicated by a heavy line 58. The reservoir is similar to the reservoir shown in FIG. 2. The orientation of the subterranean reservoir is indicated by the cardinal compass points (marked N, E, S and W for North, East, South and West respectively) indicated in the upper right of the figure. In this example, the receivers 25 are uniformly distributed in a square-grid pattern so as to approximately cover the reservoir 56. In performing a survey, an HED transmitter (not shown) starts from the location marked 'A' in FIG. 19 and is towed, whilst broadcasting continuously as described above, along a path indicated by the broken line 60. The survey is completed when the transmitter reaches the location marked 'B'. Electric and magnetic field data are continuously collected by the receivers 25 throughout the towing process and the position of the HED transmitter relative to the network of receivers is also logged.

During the towing process, each of the receivers 25 presents several different transmitter-receiver horizontal separations and orientations relative to the HED transmitter. Accordingly, by following the tow path marked, electric and magnetic field data are collected for many different transmitter-receiver horizontal separations along many different directions. These data can be combined to generate combined response data of the kind defined in Equation 7 or 8. The combined response data may be inverted to provide a thorough map of the subterranean strata configuration using appropriate geophysical inversion techniques. In this way a simple continuous towing of the transmitter can provide a detailed survey which covers the extent of the subterranean reservoir 56. In cases where vertical gradients in the fields are to be determined by towing a conventional HED transmitter at two different heights, the path shown in FIG. 19 will be followed twice. Firstly with the HED transmitter at a first height and then subsequently with the transmitter at a second height. Although in general it will be preferable for the HED transmitter to be towed at a fairly constant height during each tow, conventional radar and/or echo location techniques, for example, can be used to record the height of the HED transmitter at each location during each tow. This means vertical gradients in the fields can be determined based on differences in the detected signals and differences in the measured heights at each location.

Figure 2:
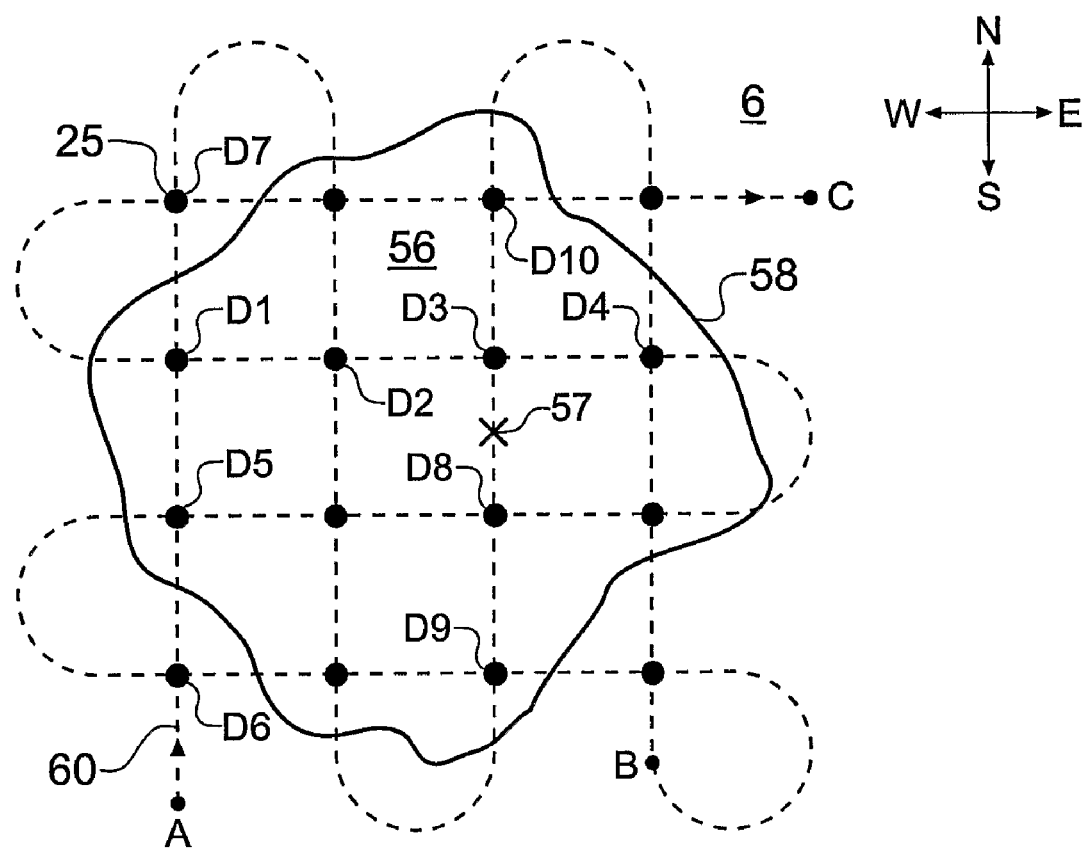
FIG. 2 is a schematic plan view showing an example survey geometry for providing data to be analysed according to a previously proposed method in which sixteen receivers are laid out on a section of seafloor above a subterranean reservoir.
Figure 3A:
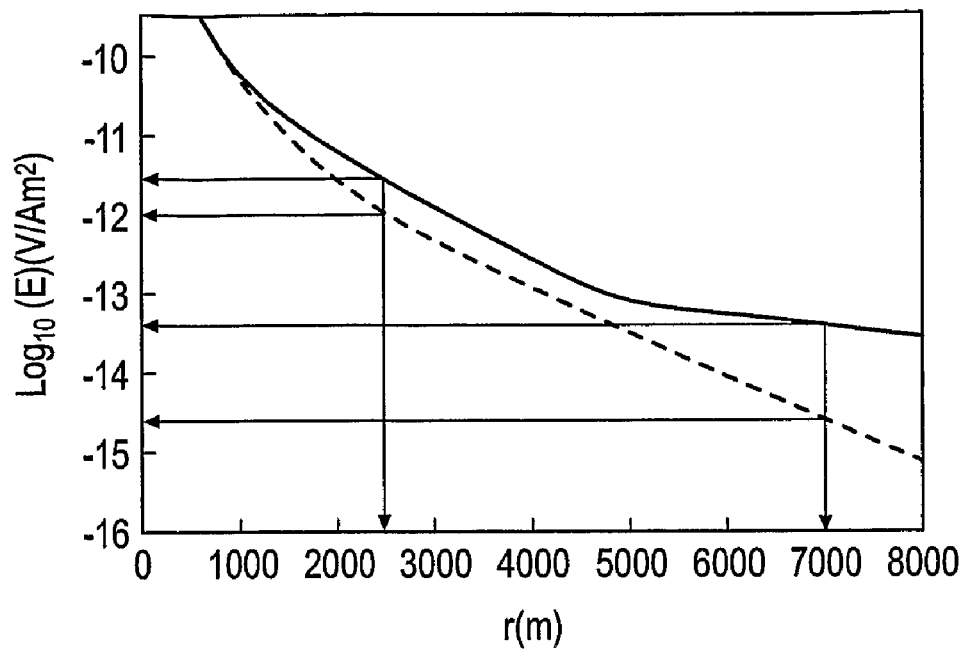
FIG. 3A is a graph plotting detector signals calculated from two model surveys analysed according to the previously proposed method, one performed in deep water (dotted line) and one performed in shallow water (solid line)
Figure 3B:
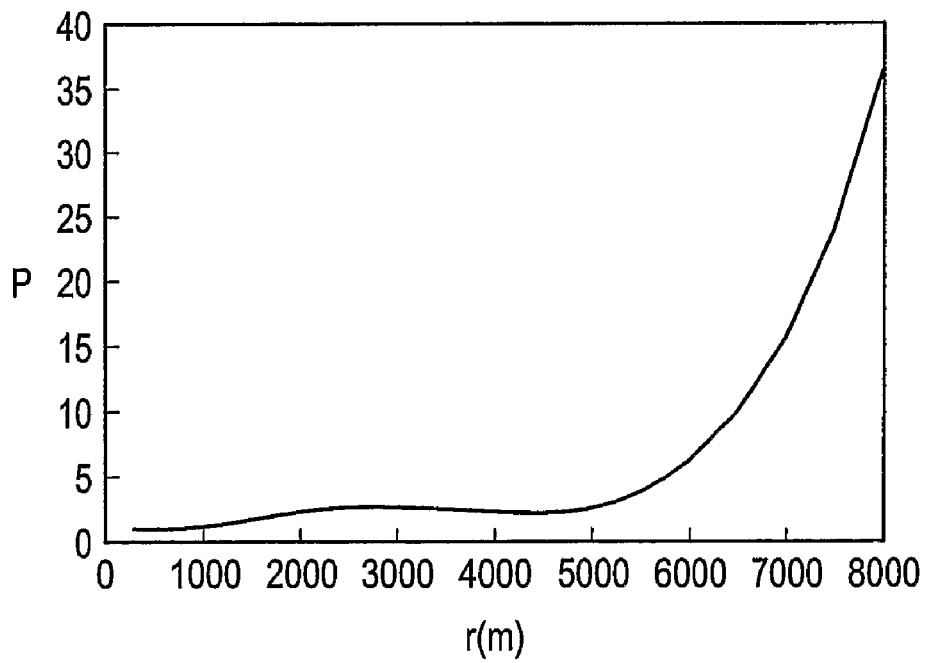
FIG. 3B is a graph plotting the ratio of the two curves shown in FIG. 3A.

As described above, FIG. 2 shows for comparison an example tow path which might be followed in performing a survey to obtain data to be analysed using previously known techniques. The tow path shown in FIG. 2 is approximately twice as long as that shown in FIG. 19. Furthermore, when performing an EM survey according FIG. 19, useful response data can be collected when the HED transmitter is at all points along a tow path. This is because a suitable TM mode decomposition can be determined for all transmitter-receiver orientations.

The TM mode decomposition analysis technique thus allows a greater amount of useful data to be collected from a shorter tow path than the previous proposed end-on/broadside analysis method. The same is true of the TE mode decompositions where these are used for background normalisation, for example in deep water surveys where the airwave effect on the TE mode decomposition is not important. In these cases TM and TE mode decomposition data can be obtained simultaneously and for the same transmitter-receiver separations and orientations. This has the further benefit of reducing any ambiguities arising where the subterranean strata is not truly one dimensional.

Although the above example is based on a square receiver grid, it will be understood that a wide variety of receiver placements may be used. For example other high symmetry regular grids, such as triangular or rectangular, may be used. In addition irregular grids may be used that have no high level of symmetry.

During surveying, transmitter and receiver positions can be determined using standard long and/or short and/or ultra-short baseline acoustic navigation systems and processed to determine the horizontal separation between the transmitter and receiver.

It can be seen from FIG. 19 that with the presently proposed analysis techniques, subterranean strata can be comprehensively surveyed with relatively few receivers and EM transmitter tows. This reduces the time taken, and hence cost, of an exploratory EM survey.

It will be understood that whilst the above description describes a towed HED transmitter, the method would also be applicable in a fixed installation. For example, the method could be used to monitor changes to a hydrocarbon reservoir from which hydrocarbon is being drawn. In such cases it will be appropriate to employ one (or more) HED transmitter(s) in fixed positions relative to a receiver array rather than undertake frequent towed surveys. The HED transmitter(s) could be anchored to the seafloor or suspended from an oil-rig platform, for example. In other examples, the HED transmitter(s) could be placed in a horizontal well or borehole, e.g. a geotechnical borehole. In the case of a producing oil field, the subterranean structures are likely to be well known already from prior geophysical surveys and drilling results. Indeed, prior geophysical and geological information from the oil field can be used to construct a background model as described above.

Although the above description has concentrated on application of embodiments of the invention to hydrocarbon reservoirs, it will be appreciated that the above described techniques may also be used for other CSEM surveys. This is because CSEM surveying is sensitive to the geoelectric properties of the earth (e.g. electrical resistivity of sub-surface strata), and not to hydrocarbon reservoirs in particular. As a consequence, embodiments of the invention are equally applicable to surveying for other resistive or conductive bodies (i.e. having a resistivity different to that of the background surrounding strata) and not just for direct hydrocarbon detection.

Embodiments of the invention may be applied to structural mapping of salt or basalt bodies for example and also where more conductive strata are present in the earth, such as siliceous sediments. In these cases, the technique and mathematics (including decompositions to overcome the shallow water problem) are the same.

In addition to surveying for oil and gas, examples of particular exploration environments in which CSEM surveying techniques of the kind described above can be useful include the following:

Marine gas hydrates. There is interest in studying gas hydrate deposits for a number of reasons. Firstly, they are considered to be a hazard to be avoided while drilling the sea floor. This is because they can cause the subterranean strata to be unstable and lead to seafloor collapse, and because their release into the atmosphere can be environmentally damaging as they are a source of powerful greenhouse gases. Secondly, they are a potential source of energy. Marine gas hydrates typically occur in the upper few hundred meters of the seafloor. Their resistivities vary with hydrate content, but are typically on the order of 2-6 $\Omega$m. When applying the above described techniques to surveying for marine gas hydrates, higher frequencies and smaller offsets (which are more sensitive to shallow structure) might be preferred during acquisition of the CSEM data.

Salt bodies: In the oil exploration environment the mapping of salt bodies can be of interest. Such salt bodies usually have a large extent (several kilometers is not unusual), are highly resistive (few hundred $\Omega$m to a thousand $\Omega$m) and can be several hundred meters to more than a kilometer thick. It is quite common that hydrocarbon reservoirs are found close to or beneath them. However mapping salt bodies can be technically challenging using conventional seismic methods—although the top of the bodies can in general be constrained, the high degree of seismic scattering they cause can make the sides and bottom more elusive. This leads to ambiguities in interpretation. In such circumstances marine CSEM methods can provide valuable complementary information on the extent of the salt body.

For similar reasons, CSEM data can also be used to complement more conventional exploration techniques in areas where intrusive volcanic layers are present in the section.

Finally, it will be understood that the invention is equally applicable to surveying of freshwater, for example large lakes or estuaries, so that references to seafloor, seawater etc. should not be regarded as limiting and should be interpreted as covering lakebed, riverbed etc. Indeed the applicability of the invention to shallow water makes it ideal for surveying shallow lakes.

REFERENCES

[1] GB2 382 875 A
[2] MacGregor, L. M. & Sinha, M. C. Use of marine controlled source electromagnetic sounding for sub-basalt exploration. Geophysical Prospecting, 48, 2000, 1091-1106.
[3] WO 02/14906 A1
[4] MacGregor, L. M., Constable, S. C. & Sinha, M. C. The RAMESSES experiment III: Controlled source electromagnetic sounding of the Reykjanes Ridge at 57° 45' N. Geophysical Journal International, 135, 1998, 773-789.
[5] Eidesmo, T., Ellingsrud, S., MacGregor, L. M., Constable, S., Sinha, M. C., Johansen, S., Kong, F-N & Westerdahl, H., Sea Bed Logging (SBL), a new method for remote and direct identification of hydrocarbon filled layers in deepwater areas. First Break, 20, 2002, 144-152.
[6] Ellingsrud, S., Eidesmo, T., Johansen, S., Sinha, M. C., MacGregor, L. M. & Constable, S. Remote sensing of hydrocarbon reservoirs by seabed logging (SBL): Results from a cruise offshore Angola. The Leading Edge, 21, 2002, 972-982.
[7] Chave, A. D. & Cox, C. S., Controlled electromagnetic sources for measuring electrical conductivity beneath the oceans, 1. Forward problem and model study. J. Geophys. Res., 87, 5327-5338, 1982.
[8] Constable, S. C., Orange, A., Hoversten, M., Morrison, H. F., Marine magnetotellurics for petroleum exploration Part 1: A seafloor equipment system, Geophysics, 63, 1998, 816-825.
[9] U.S. Pat. No. 5,770,945
[10] GB 2 402 745 A (0313376.6)

The invention claimed is:

1. A method of analysing results from an electromagnetic survey of an area that is thought or known to contain a subterranean resistive or conductive body, comprising:
   providing electric field data and magnetic field data obtained by at least one receiver from at least one horizontal electric dipole (HED) transmitter;
   determining a vertical gradient in the electric field data; and
   combining the vertical gradient in the electric field data with the magnetic field data to generate combined response data, wherein the combining step is executed by a computer;
   wherein the resistive or conductive body is a resistive body, and wherein the resistive body is a hydrocarbon reservoir.

2. A method of analysing results from an electromagnetic survey according to claim 1, wherein the electric field data include a horizontal component of electric field resolved along a first direction and the magnetic field data include a horizontal component of magnetic field data resolved along a second direction, the first and second directions being different.

3. A method of analysing results from an electromagnetic survey according to claim 2, wherein the first and second directions are orthogonal to one another.

4. A method of analysing results from an electromagnetic survey according to claim 2, wherein the first direction is parallel to a line connecting the HED transmitter to the receiver.

5. A method of analysing results from an electromagnetic survey according to claim 2, wherein the first direction is perpendicular to a line connecting the HED transmitter to the receiver.

6. A method of analysing results from an electromagnetic survey according to claim 1, wherein the vertical gradient in the electric field data is determined by comparing electric field data detected at different heights.

7. A method of analysing results from an electromagnetic survey according to claim 1, wherein the vertical gradient in the electric field data is determined by comparing the electric field data and data simulated using a background model.

8. A method of analysing results from an electromagnetic survey according to claim 7, wherein the data simulated using a background model provide a boundary condition for the electric field data.

9. A method of analysing results from an electromagnetic survey according to claim 1, wherein the vertical gradient in the electric field data at a first receiver is determined by comparing electric field data from the first receiver when the transmitter is above a second receiver with electric field data from the second receiver when the transmitter is above the first receiver, and applying a predetermined adjustment to the electric field data from second receiver.

10. A method of analysing results from an electromagnetic survey according to claim 1, wherein the vertical gradient in the electric field data is determined by comparing electric field data detected from a transmitter at different heights.

11. A method of analysing results from an electromagnetic survey according to claim 1, further comprising:
   providing background data specific to the area being surveyed; and
   comparing the combined response data with the background data to obtain difference data sensitive to the presence of a subterranean resistive or conductive body.

12. A method of analysing results from an electromagnetic survey according to claim 11, wherein the background data are obtained by determining a vertical gradient in the magnetic field data and combining the vertical gradient in the magnetic field data with the electric field data.

13. A method of analysing results from an electromagnetic survey according to claim 12, wherein the vertical gradient in the magnetic field data is determined by comparing magnetic field data detected at different heights.

14. A method of analysing results from an electromagnetic survey according to claim 12, wherein the vertical gradient in the magnetic field data is determined by comparing the magnetic field data and data simulated using a background model.

15. A method of analysing results from an electromagnetic survey according to claim 14, wherein the data simulated using a background model provide a boundary condition for the magnetic field data.

16. A method of analysing results from an electromagnetic survey according to claim 12, wherein the vertical gradient in the magnetic field data at a first receiver is determined by comparing magnetic field data from the first receiver when the transmitter is above a second receiver with magnetic field data from the second receiver when the transmitter is above the first receiver, and applying a predetermined adjustment to the magnetic field data from second receiver.

17. A method of analysing results from an electromagnetic survey according to claim 12, wherein the vertical gradient in the magnetic field data is determined by comparing magnetic field data detected from a transmitter at different heights.

18. A method of analysing results from an electromagnetic survey according to claim 11, wherein the background data are obtained from a controlled source electromagnetic survey.

19. A method of analysing results from an electromagnetic survey according to claim 11, wherein the background data are obtained from a magneto-telluric electromagnetic survey.

20. A method of analysing results from an electromagnetic survey according to claim 11, wherein the background data are further combined response data obtained from another electromagnetic survey of the area performed at a different time.

21. A method of analysing results from an electromagnetic survey according to claim 11, wherein the background data are calculated from a rock formation model.

22. A method of analysing results from an electromagnetic survey according to claim 21, wherein the rock formation model is derived from a combination of geological data and resistivity data.

23. A method of analysing results from an electromagnetic survey according to claim 22, wherein the geological data are from seismological surveying.

24. A method of analysing results from an electromagnetic survey according to claim 22, wherein the resistivity data are from well logging.

25. A method of analysing results from an electromagnetic survey according to claim 1, wherein difference data are obtained as a function of position within the area.

26. A computer program product comprising a non-transitory machine readable medium bearing machine-executable instructions for implementing a method of analysing results from an electromagnetic survey according to claim 1.

27. A computer apparatus loaded with machine executable instructions for implementing the method of analysing results from an electromagnetic survey according to claim 1.

28. A method of planning an electromagnetic survey of an area that is thought or known to contain a subterranean resistive or conductive body, comprising:
creating a model of the area to be surveyed including a rock formation containing a postulated resistive or conductive body, and a body of water above the rock formation;
setting values for water depth, depth of the postulated resistive or conductive body, and resistivity structure of the rock formation;
performing a simulation of an electromagnetic survey in the model of the survey area by calculating electric field data and magnetic field data obtained by at least one simulated receiver detecting signals from at least one simulated horizontal electric dipole (HED) transmitter;
determining a vertical gradient in the electric field data; and
combining the vertical gradient in the electric field data with the magnetic field data to generate combined response data, wherein the combining step is executed by a computer.

29. A method of planning an electromagnetic survey according to claim 28, further comprising:
adjusting the model to remove the postulated resistive or conductive body; and
repeating the simulation to obtain background data for comparison with the combined response data.

30. A method of planning an electromagnetic survey according to claim 28, the method further comprising:
repeating the simulation for a number of transmitter-receiver horizontal separations and frequencies of transmitter signal in order to select optimum surveying conditions in terms of transmitter-receiver horizontal separations and frequencies for probing the resistive or conductive body.

31. A method of planning an electromagnetic survey according to claim 28, wherein the resistive or conductive body is a resistive body.

32. A method of planning an electromagnetic survey according to claim 31, wherein the resistive body is a hydrocarbon reservoir.

33. A computer program product comprising a non-transitory machine readable medium bearing machine-executable instructions for implementing the method of planning an electromagnetic survey according to claim 28.

34. A computer apparatus loaded with machine executable instructions for implementing the method of planning an electromagnetic survey according to claim 28.

35. A method for obtaining hydrocarbon from an area that contains a subterranean hydrocarbon reservoir, comprising:
providing electric field data and magnetic field data obtained by at least one receiver from at least one horizontal electric dipole (HED) transmitter during an electromagnetic survey of the area;
determining a vertical gradient in the electric field data;
combining the vertical gradient in the electric field data with the magnetic field data to generate combined response data;
identifying the subterranean hydrocarbon reservoir using the combined response data;
penetrating the subterranean hydrocarbon reservoir with a hydrocarbon-producing well; and
extracting hydrocarbon from the subterranean hydrocarbon reservoir using the hydrocarbon-producing well.

36. A method for obtaining hydrocarbon from an area that contains a subterranean hydrocarbon reservoir, comprising:
extracting hydrocarbon from the subterranean hydrocarbon reservoir, the subterranean hydrocarbon reservoir having been determined to contain hydrocarbon by means of an electromagnetic survey method comprising the steps of:
providing electric field data and magnetic field data obtained by at least one receiver from at least one horizontal electric dipole (HED) transmitter during an electromagnetic survey of the area;

determining a vertical gradient in the electric field data;
combining the vertical gradient in the electric field data with the magnetic field data to generate combined response data; and
identifying the subterranean hydrocarbon reservoir using the combined response data.

37. A method according to claim 36, wherein the extracting step includes penetrating the subterranean hydrocarbon reservoir with a hydrocarbon-producing well.

* * * * *